United States Patent
Parker et al.

(10) Patent No.: US 7,251,612 B1
(45) Date of Patent: Jul. 31, 2007

(54) METHOD AND SYSTEM FOR SCHEDULING DISTRIBUTION ROUTES AND TIMESLOTS

(76) Inventors: John E. Parker, 44-123 Puuohalai Pl., Kaneohe, HI (US) 96744; Michael L. Smith, 809 N. J St., Tacoma, WA (US) 98403

( * ) Notice: Subject to any disclaimer, the term of this patent is extended or adjusted under 35 U.S.C. 154(b) by 497 days.

(21) Appl. No.: 09/620,199

(22) Filed: Jul. 20, 2000

Related U.S. Application Data

(60) Provisional application No. 60/175,466, filed on Jan. 10, 2000, provisional application No. 60/175,465, filed on Jan. 10, 2000.

(51) Int. Cl.
G06Q 10/00 (2006.01)
(52) U.S. Cl. .................. 705/9; 705/7; 705/8
(58) Field of Classification Search .......... 705/9
See application file for complete search history.

(56) References Cited

U.S. PATENT DOCUMENTS

| | | |
|---|---|---|
| 2,781,643 A | 2/1957 | Fairweather |
| 3,406,532 A | 10/1968 | Rownd et al. |
| 3,670,867 A | 6/1972 | Traube |
| 4,213,310 A | 7/1980 | Buss |
| 4,455,453 A | 6/1984 | Parasekvakos et al. |
| 4,656,591 A | 4/1987 | Goldberg |
| 4,799,156 A | 1/1989 | Shavit et al. |
| 4,887,208 A | 12/1989 | Schneider et al. |
| 4,936,738 A | 6/1990 | Brennan |
| 5,038,283 A | 8/1991 | Caveney |
| 5,093,794 A | 3/1992 | Howie et al. |
| 5,105,627 A | 4/1992 | Kurita |
| 5,122,959 A | 6/1992 | Nathanson et al. |
| 5,235,819 A | 8/1993 | Bruce |
| 5,237,158 A | 8/1993 | Kern et al. |
| 5,246,332 A | 9/1993 | Bernard |
| 5,265,006 A | 11/1993 | Asthana |
| 5,272,638 A | 12/1993 | Martin et al. |
| 5,273,392 A | 12/1993 | Bernard |
| 5,322,406 A | 6/1994 | Pippin et al. |
| 5,363,310 A | 11/1994 | Haj-Ali Ahmadi et al. |

(Continued)

FOREIGN PATENT DOCUMENTS

FR 2696722 4/1994

(Continued)

OTHER PUBLICATIONS

U.S. Appl. No. 09/568,570, filed May 10, 2000.

(Continued)

*Primary Examiner*—Andre Boyce

(57) ABSTRACT

Computer-based methods and systems for dynamically scheduling the distribution of products and services among a system of routes and timeslots are provided. Exemplary embodiments provide a Route and Timeslot Scheduler (the "RTS"), which controls the creation, quantity, and allocation of schedule stops (or events) for each timeslot of each route based upon a calendar and template system. Each route typically represents a geographic area to which products can be delivered. Each timeslot typically represents a window of time, during which delivery stops (or events) can be scheduled. Scheduled stops/events are created based upon defaults which are specified in the template system. A calendar system is provided to specify which routes and timeslots, which would otherwise be available based upon the template system, are actually applicable to be scheduled on a given calendar day. The RTS creates scheduled stops for a designated point.

31 Claims, 17 Drawing Sheets

U.S. PATENT DOCUMENTS

| | | | |
|---|---|---|---|
| 5,395,206 A | | 3/1995 | Cerny, Jr. |
| 5,428,546 A | | 6/1995 | Shah et al. |
| 5,533,361 A | | 7/1996 | Halpern |
| 5,548,518 A | | 8/1996 | Dietrich et al. |
| 5,593,269 A | | 1/1997 | Bernard |
| 5,615,121 A | * | 3/1997 | Babayev et al. ............... 705/9 |
| 5,666,493 A | | 9/1997 | Wojcik et al. |
| 5,694,551 A | | 12/1997 | Doyle et al. |
| 5,712,989 A | | 1/1998 | Johnson et al. |
| 5,758,313 A | | 5/1998 | Shah et al. |
| 5,758,328 A | | 5/1998 | Giovannoli |
| 5,761,673 A | | 6/1998 | Bookman et al. |
| 5,768,139 A | | 6/1998 | Pippin et al. |
| H1743 H | | 8/1998 | Graves et al. |
| 5,809,479 A | | 9/1998 | Martin et al. |
| 5,826,242 A | | 10/1998 | Montulli |
| 5,826,825 A | | 10/1998 | Gabriet |
| 5,831,860 A | | 11/1998 | Foladare et al. |
| 5,832,457 A | | 11/1998 | Cherney |
| 5,834,753 A | | 11/1998 | Danielson et al. |
| 5,835,914 A | | 11/1998 | Brim |
| 5,839,117 A | | 11/1998 | Cameron et al. |
| 5,848,395 A | * | 12/1998 | Edgar et al. ............... 705/9 |
| 5,878,401 A | | 3/1999 | Joseph |
| 5,880,443 A | | 3/1999 | McDonald et al. |
| 5,893,076 A | | 4/1999 | Hafner et al. |
| 5,894,554 A | | 4/1999 | Lowery et al. |
| 5,897,622 A | | 4/1999 | Blinn et al. |
| 5,897,629 A | | 4/1999 | Shinagawa et al. |
| 5,899,088 A | | 5/1999 | Purdum |
| 5,910,896 A | | 6/1999 | Hahn-Carlson |
| 5,918,213 A | | 6/1999 | Bernard et al. |
| 5,943,652 A | * | 8/1999 | Sisley et al. ............... 705/9 |
| 5,943,841 A | | 8/1999 | Wunscher |
| 5,956,709 A | | 9/1999 | Xue |
| 5,963,919 A | | 10/1999 | Brinkley et al. |
| 5,979,757 A | | 11/1999 | Tracy et al. |
| 6,023,683 A | | 2/2000 | Johnson et al. |
| 6,061,607 A | | 5/2000 | Bradley et al. |
| 6,070,147 A | | 5/2000 | Harms et al. |
| 6,073,108 A | * | 6/2000 | Peterson ............... 705/8 |
| 6,081,789 A | | 6/2000 | Purcell |
| 6,083,279 A | | 7/2000 | Cuomo et al. |
| 6,085,170 A | * | 7/2000 | Tsukuda ............... 705/26 |
| 6,101,481 A | * | 8/2000 | Miller ............... 705/9 |
| 6,140,922 A | | 10/2000 | Kakou |
| 6,178,510 B1 | | 1/2001 | O'Connor et al. |
| 6,185,625 B1 | | 2/2001 | Tso et al. |
| 6,215,952 B1 | | 4/2001 | Yoshio et al. |
| 6,233,543 B1 | | 5/2001 | Butts et al. |
| 6,249,801 B1 | | 6/2001 | Zisapel et al. |
| 6,260,024 B1 | | 7/2001 | Shkedy |
| 6,275,812 B1 | * | 8/2001 | Haq et al. ............... 705/11 |
| 6,289,260 B1 | | 9/2001 | Bradley et al. |
| 6,292,784 B1 | | 9/2001 | Martin et al. |
| 6,324,520 B1 | | 11/2001 | Walker et al. |
| 6,332,334 B1 | | 12/2001 | Faryabi |
| 6,341,269 B1 | | 1/2002 | Dulaney et al. |
| 6,343,275 B1 | | 1/2002 | Wong |
| 6,397,246 B1 | | 5/2002 | Wolfe |
| 6,405,173 B1 | | 6/2002 | Honarvar et al. |
| 6,424,947 B1 | | 7/2002 | Tsuria et al. |
| 6,445,976 B1 | * | 9/2002 | Ostro ............... 700/226 |
| 6,453,306 B1 | | 9/2002 | Quelene |
| 6,463,345 B1 | | 10/2002 | Peachey-Kountz et al. |
| 6,463,420 B1 | | 10/2002 | Guidice et al. |
| 6,490,567 B1 | | 12/2002 | Gregory |
| 6,496,205 B1 | | 12/2002 | White et al. |
| 6,505,093 B1 | | 1/2003 | Thatcher et al. |
| 6,505,171 B1 | | 1/2003 | Cohen et al. |
| 6,526,392 B1 | | 2/2003 | Dietrich et al. |
| 6,530,518 B1 | | 3/2003 | Krichilsky et al. |
| 6,567,786 B1 | | 5/2003 | Bibelnieks et al. |
| 6,571,213 B1 | | 5/2003 | Altendahl et al. |
| 6,578,005 B1 | * | 6/2003 | Lesaint et al. ............... 705/8 |
| 6,598,027 B1 | | 7/2003 | Breen, Jr. |
| 6,622,127 B1 | | 9/2003 | Klots et al. |
| 6,654,726 B1 | * | 11/2003 | Hanzek ............... 705/26 |
| 6,697,964 B1 | | 2/2004 | Dodrill et al. |
| 6,741,995 B1 | | 5/2004 | Chen et al. |
| 6,748,418 B1 | | 6/2004 | Yoshida et al. |
| 6,763,496 B1 | | 7/2004 | Hennings et al. |
| 6,862,572 B1 | | 3/2005 | de Sylva |
| 6,970,837 B1 | | 11/2005 | Walker et al. |
| 6,990,460 B2 | | 1/2006 | Parkinson |
| 2001/0037229 A1 | | 11/2001 | Jacobs et al. |
| 2001/0042021 A1 | | 11/2001 | Matsuo et al. |
| 2001/0047285 A1 | | 11/2001 | Borders et al. |
| 2001/0047310 A1 | | 11/2001 | Russell |
| 2001/0049619 A1 | * | 12/2001 | Powell et al. ............... 705/9 |
| 2001/0049672 A1 | * | 12/2001 | Moore et al. ............... 707/1 |
| 2002/0004766 A1 | | 1/2002 | White |
| 2002/0013950 A1 | | 1/2002 | Tomsen |
| 2002/0038224 A1 | | 3/2002 | Bhadra |
| 2002/0049853 A1 | | 4/2002 | Chu et al. |
| 2002/0065700 A1 | * | 5/2002 | Powell et al. ............... 705/9 |
| 2002/0188530 A1 | | 12/2002 | Wojcik et al. |
| 2002/0194087 A1 | | 12/2002 | Spiegel et al. |
| 2003/0045340 A1 | | 3/2003 | Roberts |
| 2003/0079227 A1 | | 4/2003 | Knowles et al. |
| 2003/0233190 A1 | | 12/2003 | Jones |
| 2004/0236635 A1 | | 11/2004 | Publicover |
| 2005/0027580 A1 | | 2/2005 | Crici et al. |
| 2005/0144641 A1 | | 6/2005 | Lewis |

FOREIGN PATENT DOCUMENTS

| | | |
|---|---|---|
| GB | 2 265 032 A | 9/1993 |
| WO | WO99/07121 | 2/1999 |

OTHER PUBLICATIONS

U.S. Appl. No. 09/568,571, filed May 10, 2000.
U.S. Appl. No. 09/568,572, filed May 10, 2000.
U.S. Appl. No. 09/568,603, filed May 10, 2000.
U.S. Appl. No. 09/568,613, filed May 10, 2000.
U.S. Appl. No. 09/568,614, filed May 10, 2000.
U.S. Appl. No. 09/568,823, filed May 10, 2000.
U.S. Appl. No. 09/750,385, filed Dec. 27, 2000.
U.S. Appl. No. 09/792,400, filed Feb. 22, 2001.
U.S. Appl. No. 09/813,235, filed Mar. 19, 2001.
"Estimation of Consumer Demand with Stock-Out Based Substitution: An Application to Vending Machine Product", Anupindi, Ravi; Dada, Maqbool; Gupta, Sachin; Marketing Science; vol. 17, No. 4, 1998, pp. 406-423.
"Management of Multi-Item Retail Inventory Systems with Demand Substitution"; Smith, Stephen, Agrawal, Narendra; Operations Research; vol. 48, No. 1, January-February, pp. 50-64.
Automatic ID News, "20/20 Results Achieved with Technology Trio", Sep. 1995, p. 19.
Henry Towie, "On the Fast Track with Totaltracks: UPS Deploys Mobile Date Service," Abstract No. XP-000560076, Document Delivery World, vol. 9, No. 3, 1993, pp. 30-31.
Hiroo Kawata, "Information Technology of Commerical Vehicles in the Japanese Parcel Service Business," Abstract No. XP-000560489, 1992, pp. 371-382.
Koster, Rene de, "Routing Orderpickers in a Warehouse: A Comparison Between Optimal and Heuristic Solutions," IIE Transactions, vol. 30, No. 5, p. 469, May 1998.
Maloney, David, "The New Corner Drugstore", May 1, 2000, Modern Materials Handling, vol. 55, No. 5, p. 58.
PC Foods, "Customer Service Agreement," printed from website: http://www.pcfoods.com, Abstract No. XP-002245026, 1999, pp. 1-2.

Takashi Sekita, "The Physical Distribution Information Network in the Home-Delivery Business," Japan Computer Quarterly, Abstract No. XP-00.431194, 1990, pp. 23-32.

The Impact of Electronic Data Interchange on Competitiveness in Retail Supply Chain, Brian Fynes et al., IBAR v14n2 pp. 16-2 1993.

Van Den Berg, Jeroen, P, "A Literature Survey on Planning and Control of Warehousing Systems", IIE Transactions vol. 31, No. 3, p. 751, Aug. 1999.

Vass et al., "The World Wide Web—Everything you (n)ever wanted to know about its server", IEEE, Oct./Nov. 1998, pp. 33-37.

Wilson, Joe, "Selecting Warehouse Management Software (WMS) for Food Distribution Operations", Frozen Food Digest, Oct. 1998, vol. 14, No. 1, p. 18.

Wunnava et al., "Interactive Multimedia on the World Wide Web", IEEE, Aug. 1999, pp. 110-115.

Norton, Tim R., "End-To-End Response-Time: Where to Measure?", Computer Measurement Group Conference Proceedings, CMG99 Session 423, Dec. 1999, pp. 1-9.

Hyten, Todd, "Stop & Shop mulls online grocery store", Boston Business Journal (Boston, MA, US), vol. 16, No. 6, p. 1, Mar. 22, 1996.

Pearce, Michael R. "From carts to clicks", Ivey Business Quarterly, vol. 63, No. 1, p. 69-71, Autumn 1998.

"Peapod Interactive Grocery Shopping and Delivery Service Now Delivers Via the Internet", Press Release, peapod.com, Apr. 22, 1996, pp. 1-2.

Worth Wren Jr., Fort Worth Star-Telegram Texas, "Albertson's Expects Online Grocery Shopping To Boom", KRTBN Knight-Ridder Tribune Business News (Fort Worth Star-Telegram, Texas), Nov. 9, 1998.

www.peapod.com, including Introduction to Peapod; How Peapod Works; Peapod: Choosing a Delivery Time; Peapod: Sending Your Order; Retrieved from Internet Archive (web.archive.org) on Jul. 23, 2006, alleged date Nov. 13, 1996, pp. 1-9.

* cited by examiner

METHOD AND SYSTEM FOR SCHEDULING DISTRIBUTION ROUTES AND TIMESLOTS

CROSS-REFERENCE TO RELATED APPLICATIONS

This application claims the benefit of Provisional Application No. 60/175,466, filed Jan. 10, 2000 and of Provisional Application No. 60/175,465, filed Jan. 10, 2000, which are incorporated herein by reference in their entirety.

TECHNICAL FIELD

The present invention relates to a method and system for controlling the scheduling of distribution routes and timeslots and, in particular, to computer software that dynamically schedules distribution routes and timeslots based upon a calendar and template system.

BACKGROUND OF THE INVENTION

Present delivery environments provide static mechanisms for the scheduling and delivery of goods, or other products or services. In some environments, there are a fixed number of delivery vehicles and personnel, and orders for delivery are accepted based upon the capacity of these vehicles and personnel. For example, a flower shop may have two trucks and two drivers, and, based upon how its schedule fills up on a particular day, the shop may either accept an order or inform the customer that flowers cannot be delivered when desired. One disadvantage of such a system is that customers are disappointed when their needs cannot be met and may not return to the shop for future service. As another example, a pizza parlor may schedule deliveries based entirely upon the availability of a fixed pool of drivers and a history of order traffic. To handle its deliveries, the pizza parlor would typically schedule sufficient delivery trucks and personnel to accommodate an average delivery load for that day, based upon past order data. When the load exceeds the availability of drivers, the delivery times available for the delivery of more orders get pushed out so far that customers are apt to go elsewhere. The pizza parlor thus pays an opportunity cost for not having its delivery schedule able to dynamically handle a changing order environment.

Other environments have offered other solutions. For example, some environments provide load balancing of orders among a fixed set of delivery resources after the orders are made. For example, a beverage distributor might have a fleet of different types of delivery vehicles with various sizes and load capacities. In order to accommodate a variety of different types of customer orders, varying from small sandwich shops, to small convenience stores, then to large chain stores, the distributor needs to optimize deliveries across the fleet. Typically, the distributor performs load balancing by shutting off orders at a particular time of day and running an optimizing computer program to automatically assign particular orders to particular vehicles. The optimizing program uses information about each customer and about each vehicle to maximize the drive time efficiency of the distributor's fleet. One disadvantage of such a system is that orders are typically cut off early during the day because the system is static—it performs post-processing on the order data. Although such a solution optimizes the available resource, it doesn't address accommodating an ever-changing order environment.

SUMMARY OF THE INVENTION

Embodiments of the present invention provide computer-based methods and systems for dynamically scheduling the distribution of products and services among a system of routes and timeslots. Embodiments of the present invention provide a Route and Timeslot Scheduler (the "RTS"), which controls the creation, quantity, and allocation of schedulable timeslot segments (segments of time) for each timeslot of each route based upon a calendar and template system. Each route typically represents a geographic area to which products can be delivered. Each timeslot typically represents a window of time (one or more timeslot segments), during which delivery stops (or events) can be scheduled. A schedule of timeslot segments is created based upon defaults which are specified in the template system. A calendar system is provided to specify which routes and timeslots, which would otherwise be available based upon the template system, are actually applicable to be scheduled and subsequently allocated on a given calendar day.

In one embodiment, the RTS schedules timeslot segments for a designated potential order period. Another system or subsystem, programmed to interface to the RTS, can then allocate these scheduled timeslot segments to actual delivery stops or other events. The RTS allows a user or other system, manual or automated, to modify the current schedule by changing the number of scheduled timeslot segments available, the allocation and distribution of delivery stops to different timeslots and routes, the definitions of the timeslots and routes, and other similar information.

In yet another embodiment, the RTS includes an alert mechanism, which notifies a user when the number of actual delivery stops (allocated timeslot segments) have come within or exceeded a specified level, typically relative to the number of scheduled timeslot segments within a timeslot. In one embodiment, when the number of allocated timeslot segments are within one of the number of scheduled timeslot segments for a timeslot, a notification is provided to allow an increase of the number of scheduled timeslot segments or to otherwise load balance the system.

In another embodiment, the RTS supports the modification of the template system used to create a schedule. Routes, route types, and timeslots can be added, deleted, or otherwise modified. Further, the default number of schedulable timeslot segments can be changed. In some embodiments, the system can automatically update a current schedule to reflect changes made to the template data.

In yet another embodiment, the RTS supports the modification of the calendar system. Route type definitions can be modified and assigned to particular calendar days.

In another embodiment, the scheduled timeslots and timeslot segments, and potentially other aspects such as the template and calendar systems are unique to a particular customer fulfillment center, warehouse, or other facility.

In some embodiments, a rating system is used to allocate particular timeslot segments to specific orders or events.

BRIEF DESCRIPTION OF THE DRAWINGS

FIG. 2 is an example display screen of the Schedule component of the Route and Timeslot Scheduler user interface.

FIG. 3 is an example display screen of the Change Scheduled Stops window for modifying the number of scheduled stops for a timeslot.

FIG. 4 is an example display screen of the Template component of the Route and Timeslot Scheduler user interface, which presents template data for each day of the week.

FIG. 5 is an example display screen of the Zip Codes window invoked by the Template component to specify geographic data for a particular timeslot.

FIG. 6 is an example display screen of the Copy Route dialog invoked by the Template component to copy template route information from one day to another day.

FIG. 8 is an example display screen of the Calendar component of the Route and Timeslot Scheduler, which is used to change route information associated with calendar entries.

FIG. 9 is an example display screen for the Route Type window used by the Route and Timeslot Scheduler to define new types of routes in the system.

DETAILED DESCRIPTION OF THE INVENTION

Figure 1:
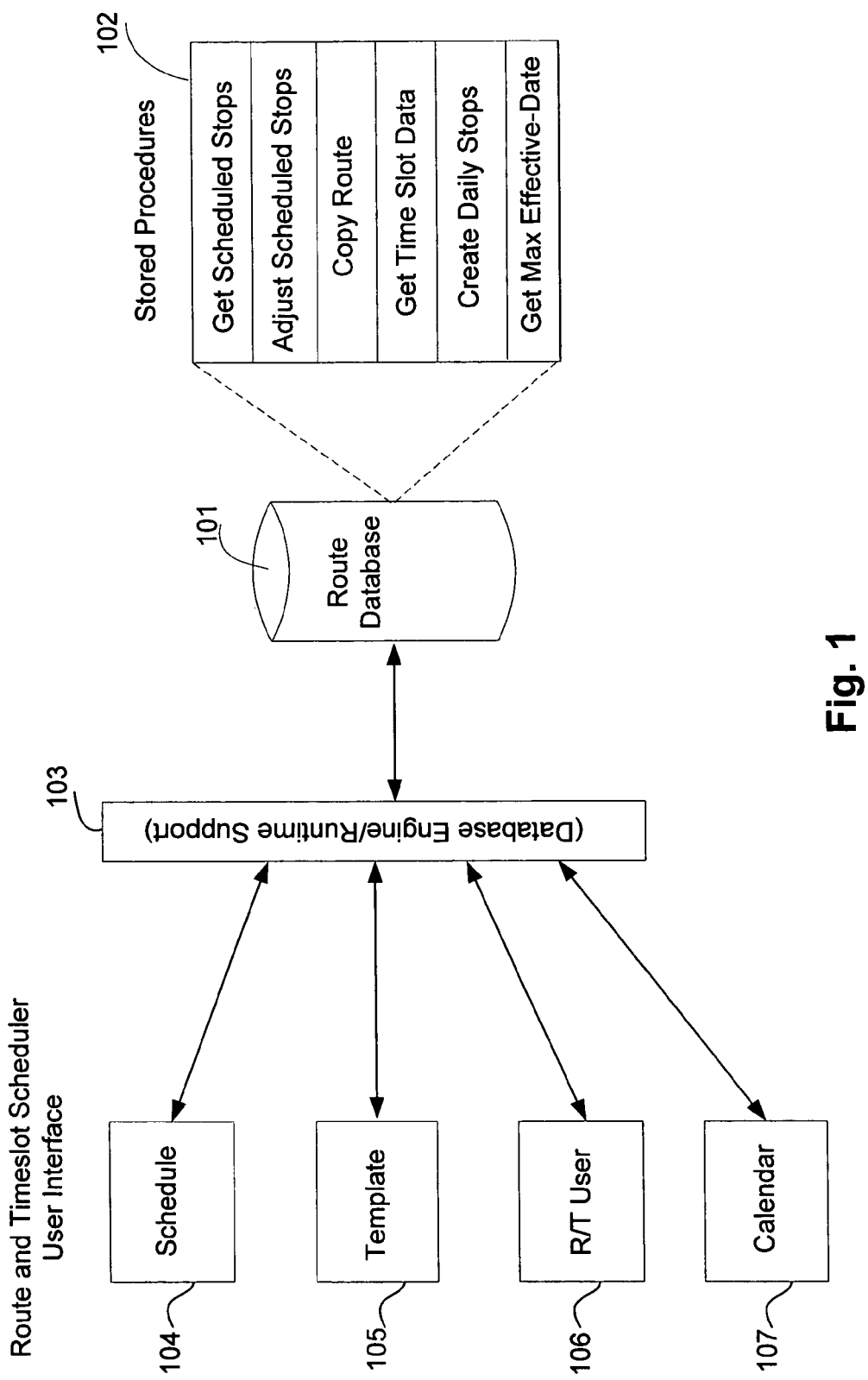
FIG. 1 is an example block diagram of an exemplary embodiment of the Route and Timeslot Scheduler of the present invention.

Embodiments of the present invention provide computer-based methods and systems for dynamically scheduling the distribution of products and services among a system of routes and timeslots. Each route typically represents a geographic area to which products can be delivered. For example, a geographic area could be defined by a set of zip codes within a particular vicinity. Each timeslot represents a window of time, during which delivery stops can be scheduled. Timeslots may be of different lengths, for example, longer timeslots may be made available for routes within larger markets. The methods and systems of the present invention provide a standardized dynamic scheduling mechanism that can be used in a consistent manner by different facilities to support scheduling data that is unique to each facility. An example embodiment, which is currently used by an electronic storefront application to schedule the home delivery of groceries and related products, is described in further detail below. Use by the electronic storefront to schedule delivery times for particular orders is described in further detail in U.S. Provisional Application No. 60/175, 465, filed on Jan. 10, 2000.

Although the routing and scheduling system is applied herein to the delivery of groceries and similar products and services, one skilled in the art will recognize that the methods and systems of the present invention can be applied to scheduling and/or delivery, or even of the manufacture, of any type of object or event that requires a "window" of time for performing some behavior. For example, such a system could be used to schedule the manufacture of certain components of a product, or the distribution of parts to various departments in a manufacturing facility, etc. In such a case, routes will be understood to encompass any grouping mechanism for scheduling such objects or events, and one or more events may be scheduled in a timeslot.

Embodiments of the present invention provide a Route and Timeslot Scheduler (the "RTS"), which controls the creation, quantity, and allocation of schedulable timeslot segments for each timeslot of a route based upon a calendar and template system. The template system provides default scheduling information for each day of the week. The calendar system provides specific information on allowed types of routes for a specific day. The two systems are combined, as discussed further below, to generate a schedule of timeslot segments for a specific day. The scheduled timeslot segments are the potentially fillable segments of time within a timeslot, which can be occupied by an order or event. For example, when an order is associated with a particular delivery timeslot, the appropriate timeslot segment is allocated to the order. One skilled in the art will recognize that one or more scheduled timeslot segments may be allocated to an order and that variations in which the scheduled timeslot segments are different length time segments are also contemplated. In one embodiment, the RTS supports the scheduling of timeslot segments up to some number of days into the future, presently sixteen. Other ranges of time periods into the future are also possible. One skilled in the art will recognize that, although the scheduled timeslot segments are generated consecutively for this number of days, the present invention could be used to generate a schedule for any arbitrary day in the future if it were desired.

The templates and calendar information that drive future schedule information can be dynamically modified and propagated to automatically revise a future day's schedule. In addition, the routes for each day as well as the timeslots and scheduled timeslot segments for each route are modifiable while the scheduling system is in use. The RTS is thus flexible and can dynamically respond to scheduling modifications based upon a myriad of factors, including, for example, road and weather conditions, delivery vehicle conditions and status, and schedule load.

FIG. 1 is an example block diagram of an exemplary embodiment of the Route and Timeslot Scheduler of the present invention. The RTS comprises several user interface components 104-107, a data repository 101, functions for manipulating the data stored in the data repository 102, and runtime support 103 to enable the user interface components to communicate with the data repository. The RTS user interface comprises four components: a Schedule component 104, a Template component 105, a User component 106, and a Calendar component 107. According to one embodiment, the user interface components 104-107 are implemented using database forms, which communicate with the route database 101 using a runtime database engine 103. In this system, the functions for manipulating the route data are maintained as the stored procedures 102 in the route database 101. One skilled in the art will recognize that many alternative implementations and organizations are possible for any and all of these components including storing the data in any type of data repository and including using any standard programming language mechanism to provide a user interface to the functions and queries used to manipulate and maintain the stored route data.

The Route and Timeslot Scheduler organizes and maintains delivery scheduling data in route database 101 for one or more routes for a potential order period. A potential order period is a period of days for which actual orders can be scheduled for delivery. In one example embodiment, the routes are organized according to geographic data such as zip codes, but, as mentioned, the routes can be based upon any desired criteria. Each route is associated with a set of timeslots for scheduling the occurrence of a number of actual delivery stops/events for that route. Each timeslot is associated with a number of scheduled timeslot segments (also referred to as "scheduled stops"), which are based upon template data. To create a schedule for a particular day, the RTS creates in the route database 101 the same number of scheduled stops for a timeslot as the number of default timeslot segments that are specified in the timeslot template for that route for that day. These scheduled stops are "placeholders" in the database until they are actually allocated to a delivery order. When allocated, the scheduled stops are referred to as actual stops. The RTS maintains data on actual stops and, thus, can optionally provide an automatic post-processing mechanism for dynamically load balancing the actual stops across the scheduled stops of all routes for a particular day. As customer orders are allocated to scheduled stops, the delivery schedule is updated. Each night the RTS system preferably updates the route database to produce future schedules. The scheduled stops in these future schedules can then be allocated by any system that has been programmed to use the RTS route database; for example, an electronic storefront that schedules the delivery of groceries and related products using the RTS.

The user interface components 104-107 operate in conjunction with the route database 101 and the stored procedures 102 to generate scheduled stops based upon the calendar data and the template data. The Schedule component 104 is used to display and dynamically modify the current routing schedule for a designated day. It allows dynamic control of the number of scheduled stops available for each timeslot in each route. The User component 106 is used to set up various access privileges for each user of the RTS system. These privileges range from allowing a user to simply display schedule data to allowing complete display and edit privileges across all facilities and across all schedule data. The Template component 105 maintains template route data for each day of the week (e.g., Sunday through Saturday). Preferably, there are different daily templates for each warehouse, or other distribution facility. Each template contains the routes that are available (typically based upon geographic data) and the set of timeslots that can be scheduled for each route. Each timeslot for a route has associated with it a default number of timeslot segments. In addition, each route is associated with a particular route type so that routes that match only certain route types can be used as template data to create a particular day's schedule. The Route Calendar component 107 associates types of routes with each calendar day for as many days as supported by the calendar system. The types of routes that are associated with a particular calendar day dictate which route types are copied from the templates to create a schedule for that particular calendar day. In this way, the calendar provides a kind of "overriding" mechanism to control the default route data that is otherwise used from the template system to create a day's scheduled stops.

FIGS. 2-9 are example display screens that correspond to the user interface components 104-107. These display screens illustrate how a user operates the RTS to set up schedule data for future delivery allocation and to modify the scheduled stops in the current day's schedule as the day is progressing.

Figure 2:
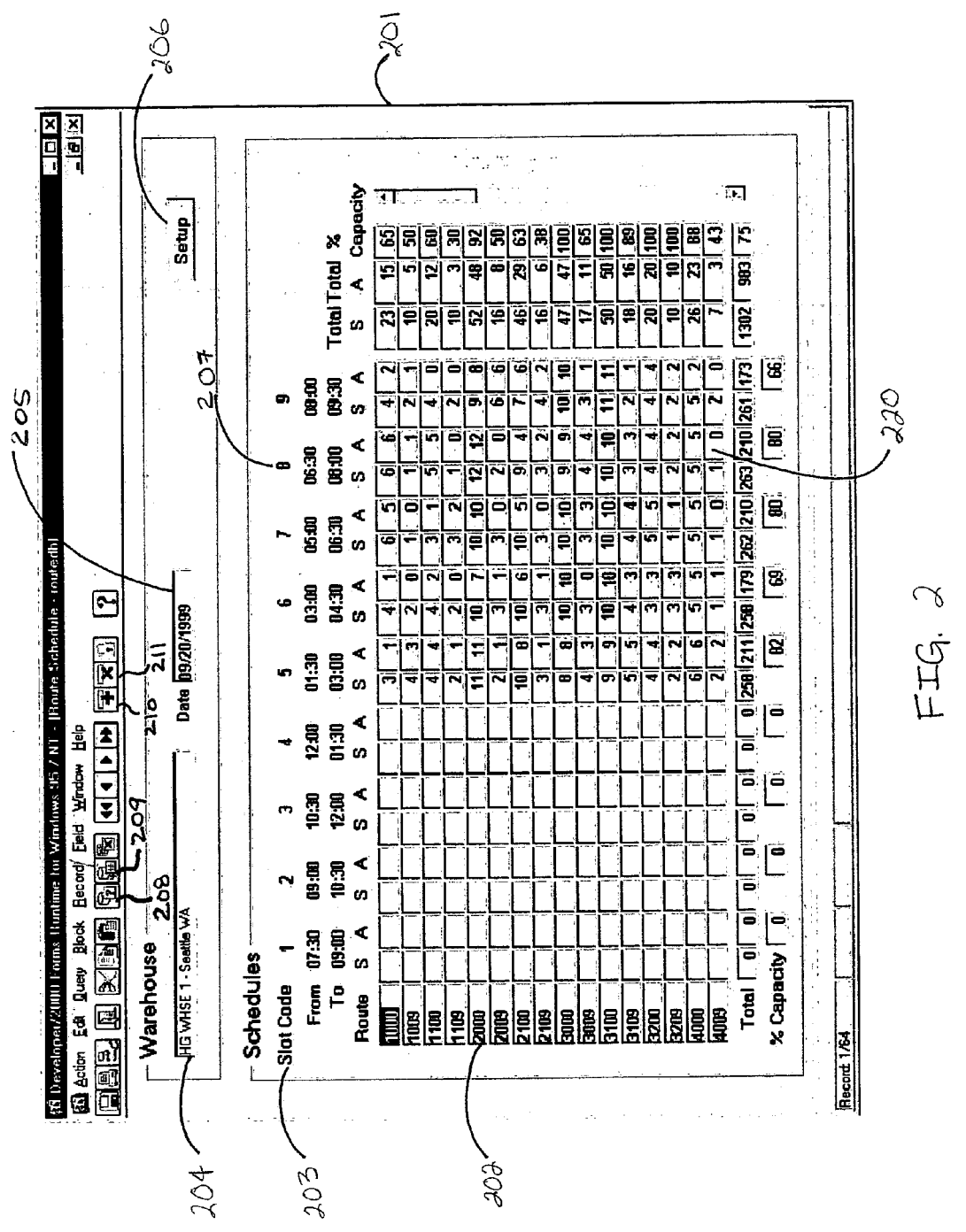

FIG. 2 is an example display screen of the Schedule component of the Route and Timeslot Scheduler user interface. The route Schedule form 201 is used to display the current schedule for the facility identified by warehouse field 204 for the day shown in date field 205. The displayed schedule shows one or more routes 202, as specified by a user, and the delivery stop information for each timeslot 207 within each displayed route 202. Each timeslot 207 displays the number of scheduled stops and the number of actual stops that have been allocated to that timeslot by another program that is using the RTS to schedule its deliveries, for example an electronic storefront. A properly authorized user may modify the number of scheduled stops for a particular timeslot by, for example, double clicking on the scheduled stops entry. This action will cause the Schedule component to display a Change Scheduled Stops window (discussed below with respect to FIG. 3).

When the number of actual stops reaches within a designated number of the number of scheduled stops, an alert mechanism is used by RTS to allow a user with proper access privileges to modify the schedule. For example, upon receiving an alert, the user can change the number of scheduled stops to provide more delivery opportunities within that timeslot, or, the user can otherwise load balance the actual stops by distributing them to other routes or to newly created routes. One skilled in the art will recognize that the alert mechanism can be used to manually change the route data, or can be used in an automated fashion to automatically load balance the system. For example, the RTS could interface to a computerized load balancing system which redistributes timeslots, delivery stops, and routes upon receiving alerts.

The query icons 208 and 209 are used to enter and execute a database query, respectively, to designate which route data to display on Schedule form 201. Icons 210 and 211 are used to insert a new route or remove a route respectively. Although not discussed with respect to the other example display screens in FIGS. 3-9, these icons are also available in the other user interface components and provide similar behavior.

The Setup button 206 on the Schedule form is provided for users having appropriate administrative privileges to invoke the other components of the RTS user interface, such as the Template form, the User form, and the Calendar form.

Figure 3:
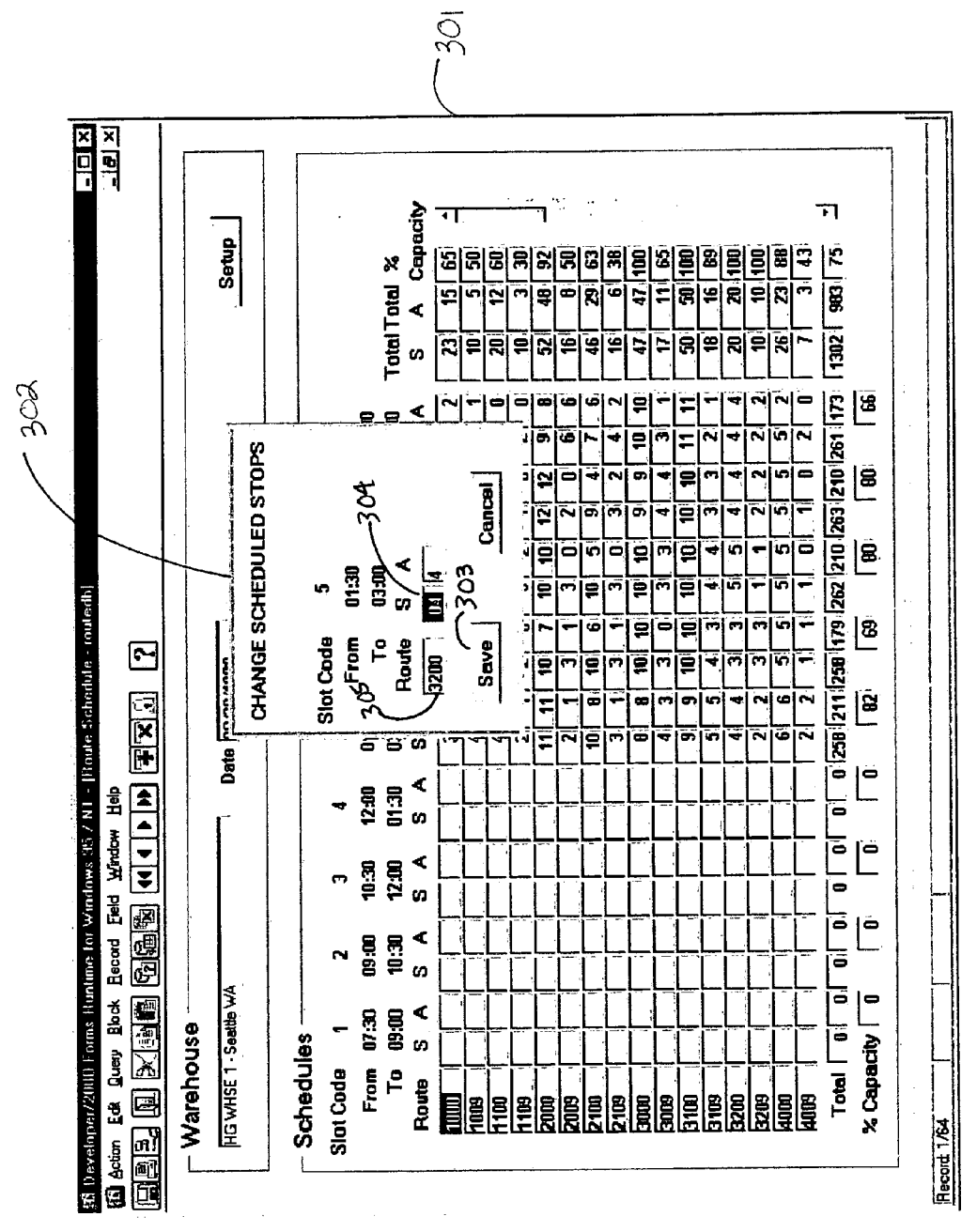

FIG. 3 is an example display screen of the Change Scheduled Stops window for modifying the number of scheduled stops for a timeslot. The Change Scheduled Stops window 302 allows a user to specify a new number of scheduled stops in Scheduled Stop field 304 for the route shown in route field 305. The Save button 303 causes the new value to be saved in the route database 101.

Figure 4:
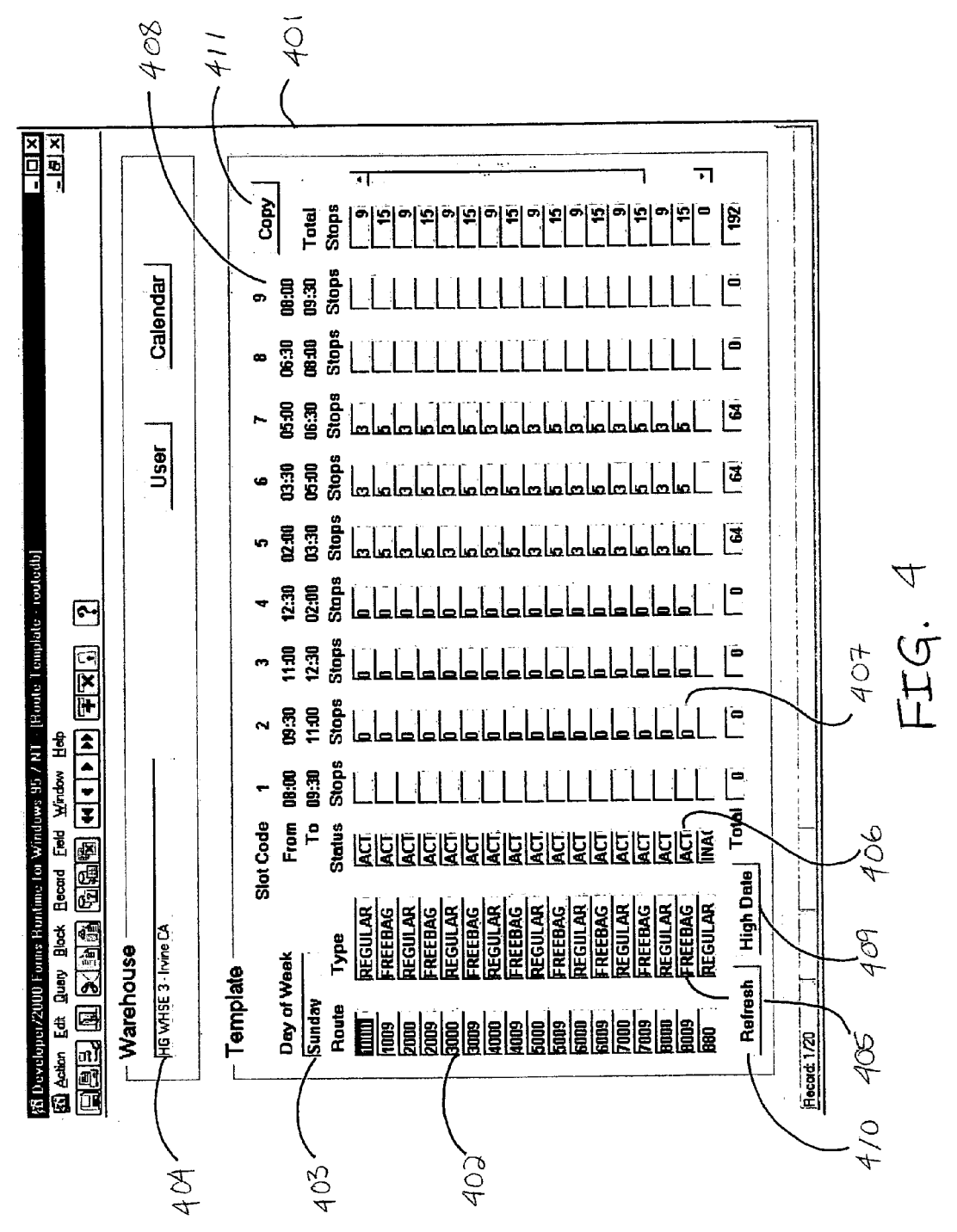

FIG. 4 is an example display screen of the Template component of the Route and Timeslot Scheduler user interface, which presents template data for each day of the week. The template form 401 displays template route data for the facility identified in a warehouse field 404 for the day of the week identified in date field 403. The Template form 401 determines from the route database 101 what routes and route types are available for the designated day of the week for the designated warehouse and lists those routes in route entries 402. Each route entry 402 indicates, in type field 405, the route type that corresponds to that route. For example, Route 3000 is a REGULAR type customer route that has an active status, as indicated in status field 406. Each route displays the number of potential stops available for each timeslot 408 within that route. The number of potential stops shown represents the default number of timeslot segments that can be scheduled for the timeslot. To change the number of potential stops for a timeslot, a user selects the particular entry and enters a new number of stops. If there are no potential stops for a particular timeslot, the stop field 407 is left blank. As explained earlier, the number of potential stops in each timeslot is used by the RTS to create placeholder records (scheduled stops) for a particular day in the future. (The scheduled stops are then associated with orders to create actual stops.) Each day, the RTS executes the CreateDailyStops routine (discussed in detail with respect to FIG. 16) to generate these placeholder scheduled stops for the next available future ordering day. Once a user has finished changing the template data for generating route information, the user can depress the Refresh button 410 on the Template form 401 to cause the database entries to be updated according to the newly modified template data. The steps performed by the RTS to accomplish this update are discussed in detail with respect to the AdjustScheduledStops routine in FIG. 14.

The High Date button 409 is selected by a user to determine the highest date in the future for which orders can be placed for the facility indicated in warehouse field 404. The steps performed by the RTS to retrieve this date are discussed in detail with respect to the GetHighestDate routine in FIG. 17.

The Copy button 411 is used to efficiently copy the route information from one route to another route, which allows the efficient population of data for the template. This button invokes the Copy Route dialog, discussed below with respect to FIG. 6.

In one embodiment, each timeslot of a route in the RTS is associated with geographical data. The geographical data represents a way to group orders such that they can be efficiently delivered by a particular delivery vehicle at a particular time. For example, the geographical data may be represented by zip codes. Zip codes are associated with a particular timeslot by, for example, double-clicking on a potential stop entry 407. This action invokes the Zip Code window, discussed with respect to FIG. 5. One skilled in the art will recognize however that any type of geographical designation or other designation that defines a subset of a route may be used to group orders. For example, the longitude and latitude coordinates that define a neighborhood's boundaries may be used instead.

Figure 5:
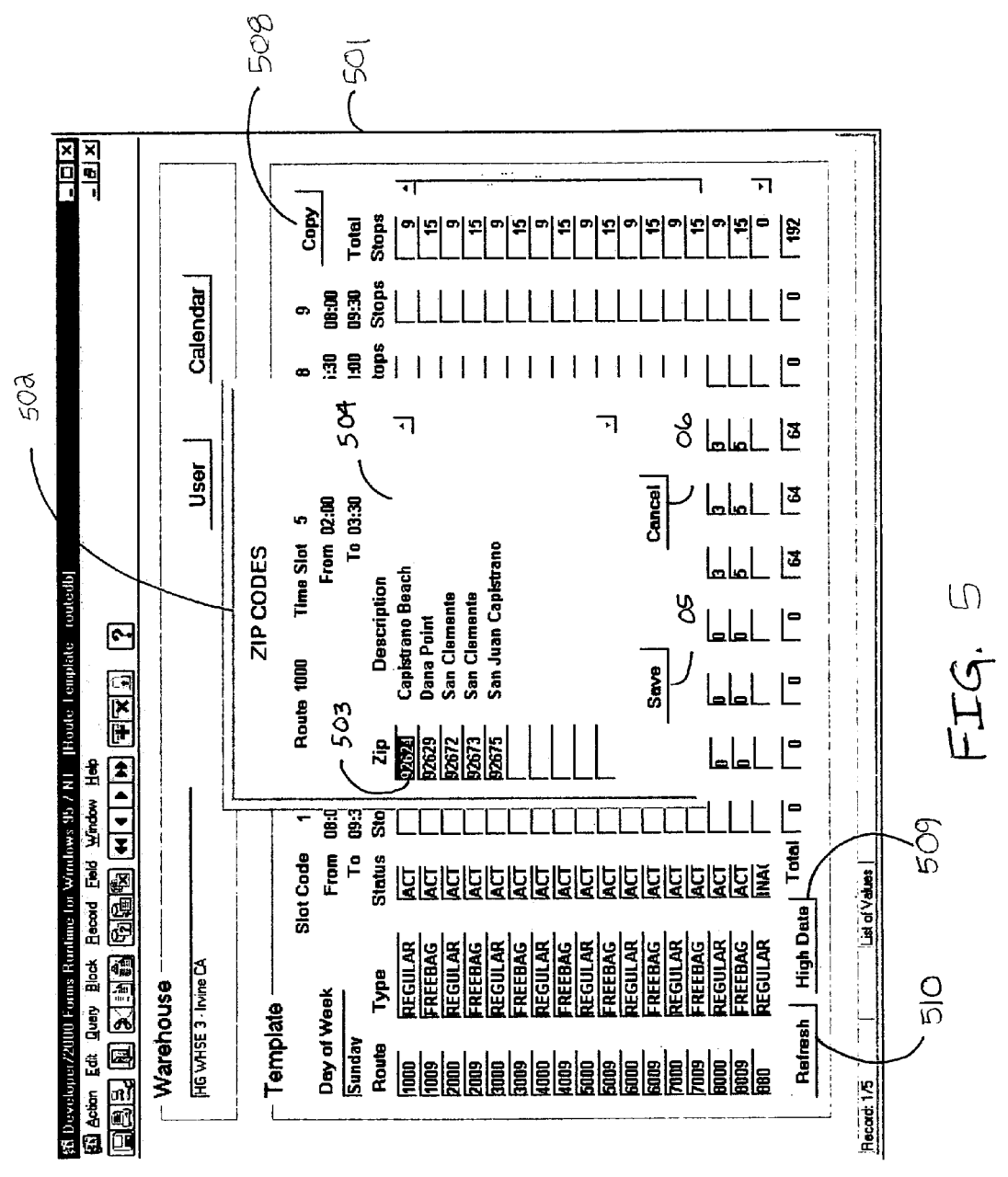

FIG. 5 is an example display screen of the Zip Codes window invoked by the Template component to specify geographic data for a particular timeslot. Zip Code window 502 contains a list of zip codes 503 and their descriptions 504, which are associated with the particular timeslot. Once the appropriate geographical data has been entered or modified, the user presses the Save button 505 to associate the geographical data with the particular timeslot, or presses the Cancel button 506 to cancel the change.

Figure 6:
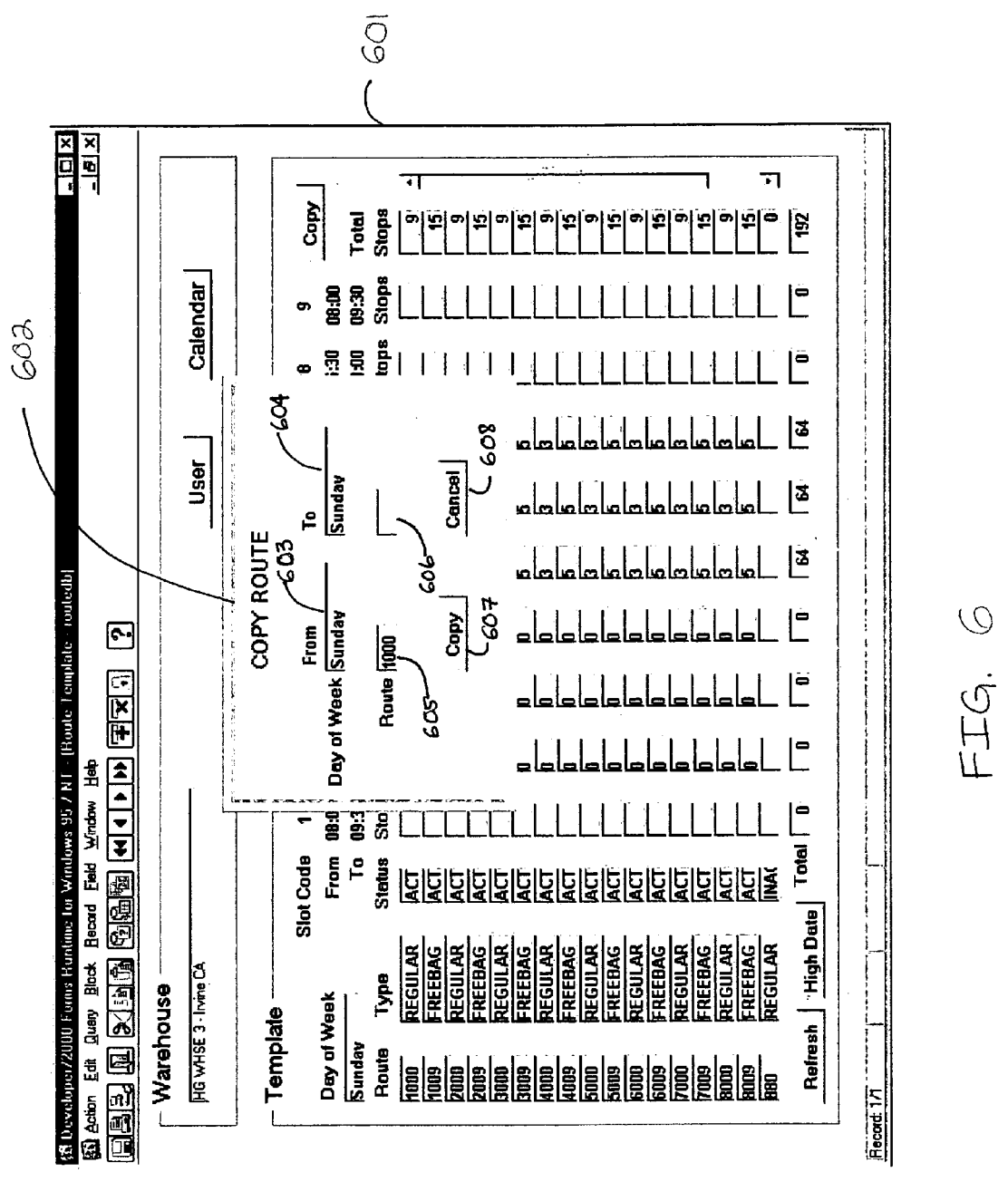

FIG. 6 is an example display screen of the Copy Route dialog invoked by the Template component to copy template route information from one day to another day. The Copy Route dialog 602 contains a source Day of Week field 603 and a source Route field 605 for specifying which template data to use as a source for copying. A destination Day of Week field 604 and destination Route field 606 indicate the destination template data to which the source data will be copied. The Copy Route dialog 602 allows all of the template data for all routes an entire day of the week to be copied to the destination day of week template data by specifying the word "ALL" in the source Route field 605. When the Copy button 607 is depressed, the RTS copies all of the data from the specified source day of the week route entries to the destination day of week route entries.

Figure 7:
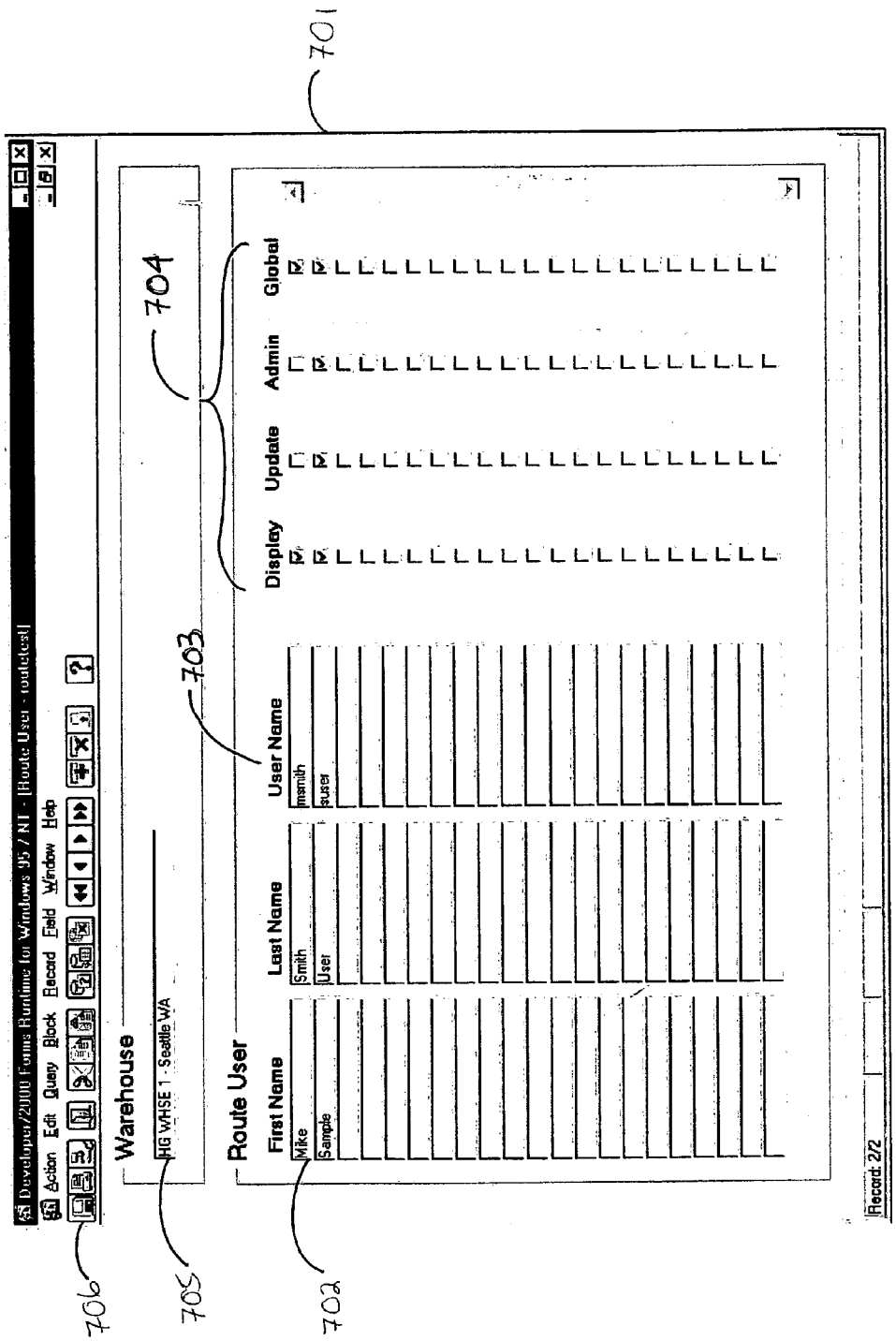
FIG. 7 is an example display screen of the User component of the Route and Timeslot Scheduler, which is used to modify user information.

The setup button 206 in FIG. 2 may also be selected by an RTS user with administrative privileges to modify the access privileges and edit user information for users of the RTS system. FIG. 7 is an example display screen of the User component of the Route and Timeslot Scheduler, which is used to modify user information. The user form 701 is associated with the warehouse indicated in warehouse field 705. A user's name information is entered in name fields 702, and a user name is entered in User Name field 703. Each user is associated with a set of access privileges, as shown in access privilege fields 704. A "Display" access privilege is selected to indicate that a user can see data. An "Update" access privilege is selected to indicate that a user may change the currently scheduled route data on the Schedule form (e.g., FIG. 2). An "Admin" access privilege is selected when a user may modify route templates, route users, and the route calendar information in the route database. A "Global" access privilege is selected when a user has permission to access the data for any warehouse. One skilled in the art will appreciate that these access privileges may be cumulative, or implemented in alternative ways to specify sets or groupings of access privileges.

Figure 8:
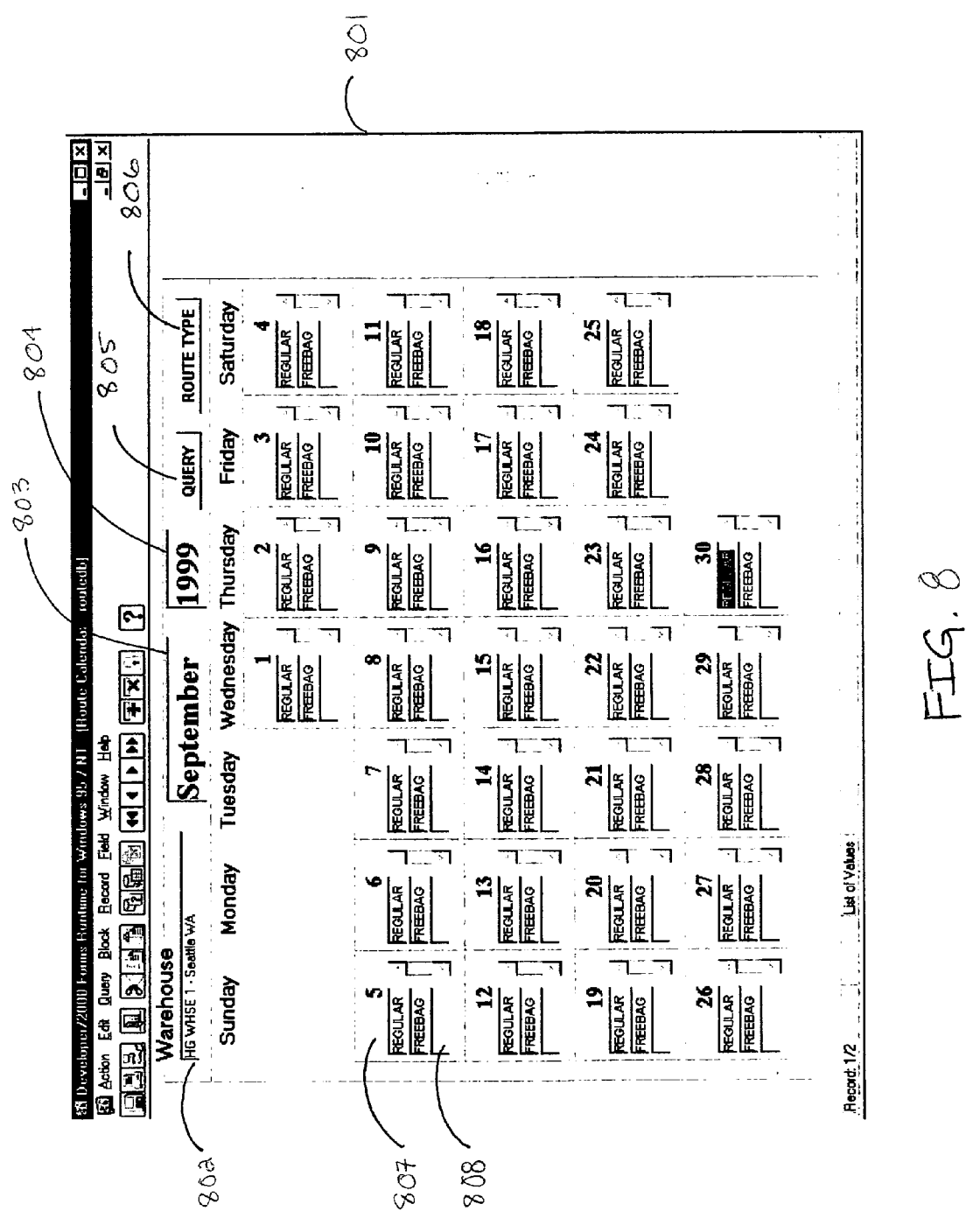

Setup button 206 in FIG. 2 may be also selected by an RTS user with administrative privileges to modify the route information associated with calendar entries. FIG. 8 is an example display screen of the Calendar component of the Route and Timeslot Scheduler, which is used to change route information associated with calendar entries. The calendar form 801 provides a list of the route types 808 for each day 807 of a selected month as specified by the date fields 803 and 804. The calendar is specific to a particular warehouse, which is indicated in the warehouse field 802. A list of route types is associated with a particular calendar day to allow date specific overrides of the default routing information provided by the template data for that day of the week. This mechanism can be used, for example, to provide different types of routes for holidays or to provide closure information without modifying the default route data.

For example, suppose the day of the month entry 807 corresponding to Sep. 5, 1999 is modified to list only route type "CLOSED" instead of the route type list shown in 808 ("REGULAR" and "FREEBAG"). Then, when the calendar is used to create scheduled stops, no routes will be provided in the schedule for Sep. 5, 1999, even though the template data for a Sunday may contain default routes that correspond to "REGULAR" and "FREEBAG" route types.

For the purposes of example, a REGULAR route is a route available for normal days and normal deliveries, and a FREEBAG route is a route that allows the distribution of free produce bags, for example, to first time customers. One skilled in the art will recognize that any type of route can be defined. The route types for a particular calendar day can be changed using the list box 808 contained in each day entry 807. In addition, a user with administrative privileges may use the Route Type button 806 to change the available list of route types.

Figure 9:
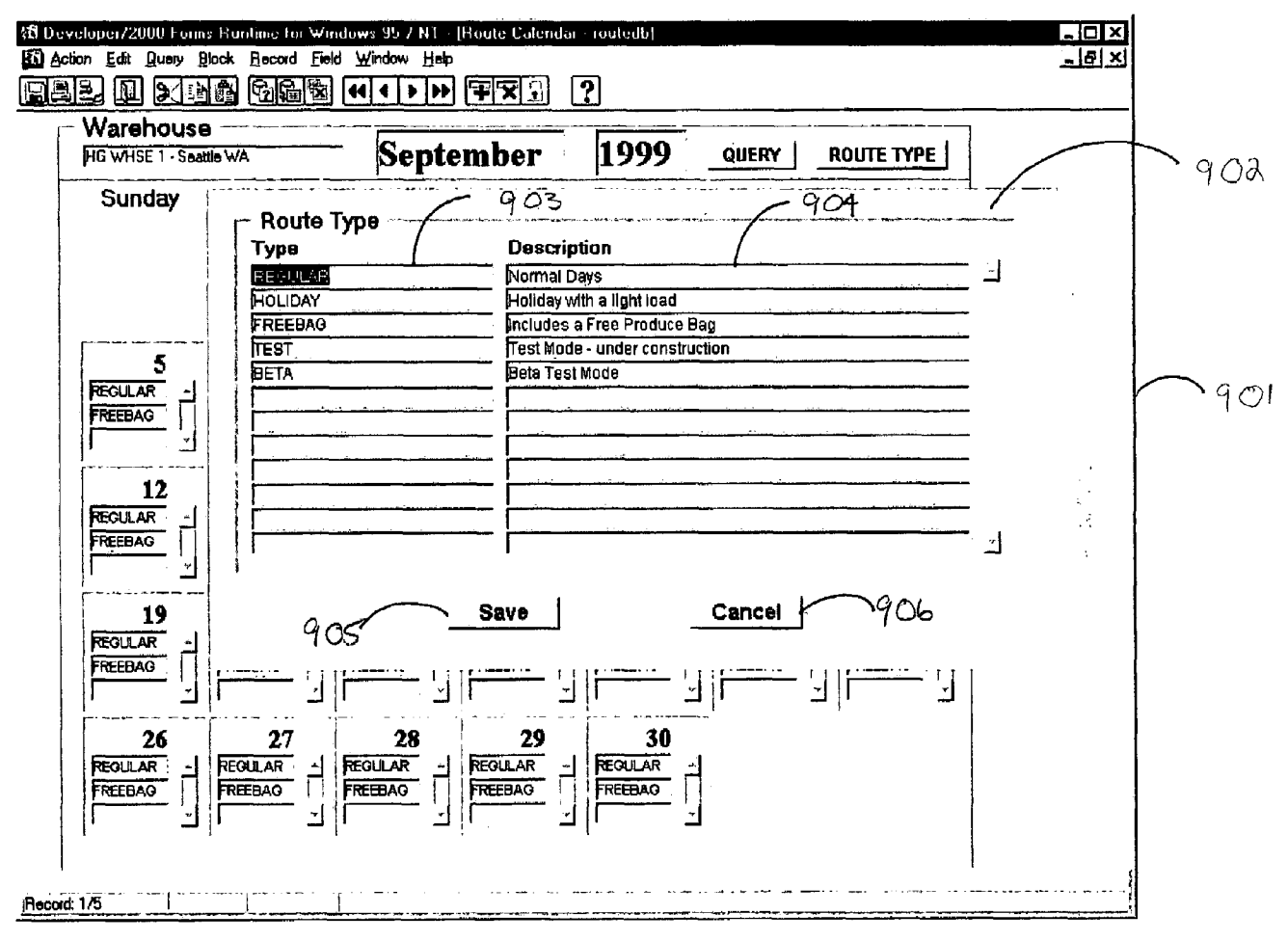

FIG. 9 is an example display screen for the Route Type window used by the Route and Timeslot Scheduler to define new types of routes in the system. Route type window 902 contains a list of the types of routes 903 and a description of each route 904. When the user is satisfied, the user can save the route type changes by depressing Save button 905, or may cancel the changes using Cancel button 906.

Figure 10:
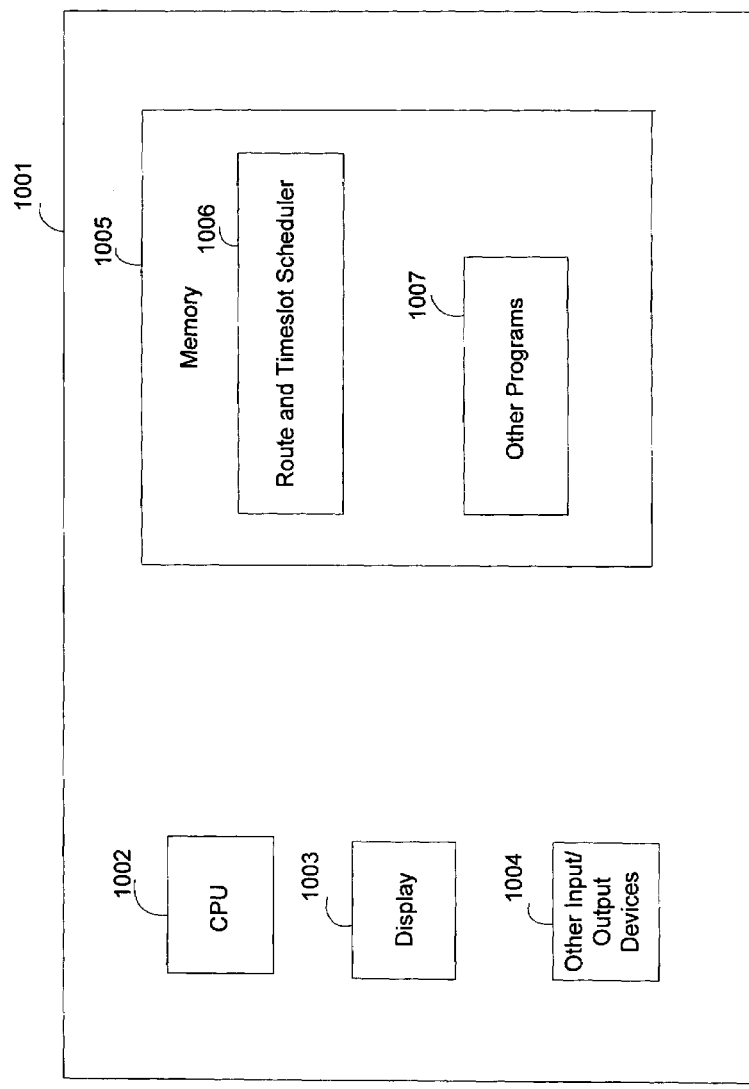
FIG. 10 is a block diagram of a general purpose computer system for practicing embodiments of the Route and Timeslot Scheduler.

FIG. 10 is a block diagram of a general purpose computer system for practicing embodiments of the Route and Timeslot Scheduler. The Computer System 1001 contains a central processing unit (CPU) 1002, a display 1003, a computer memory (memory) 1005, or other computer-readable memory medium, and other input/output devices 1004, such as network connections or other communications medium. The components of the RTS 1006 typically reside in the memory 1005 and execute on the CPU 1002. As described with respect to FIG. 1, the RTS 1006 comprises several components, including user interface components 104-107, route database 101, and database engine 103, which are shown residing in the memory 1005. Other programs 1007 also reside in the memory 1005.

One skilled in the art will recognize that exemplary Route and Timeslot Schedulers can be implemented as one or more code modules and may be implemented in a distributed environment where the various programs shown as currently residing in the memory 1005 are instead distributed among several computer systems. In addition, a computer system may itself be distributed. For example, referring to FIG. 1, the route database 101 may reside on a server computer system and execute separately from the RTS user interface components 104-107. Similarly, each of the various components of the user interface may reside on different computer systems. In addition, the route database 101 may be distributed across several computer systems and different types of memories. Other variations and configurations are also contemplated.

In an example embodiment, the RTS is implemented using the Oracle Forms Developer 2000 environment, which enables the user interface to be presented using a series of database driven forms, such as those shown in FIGS. 2-9. The Oracle database runtime environment provides support for communicating from these forms to route database 101. In addition, the functions used to maintain and manipulate the route database data are implemented using stored procedures in the database, e.g., stored procedures 102. One skilled in the art will recognize that any well-known development system(s) may be used to implement each of these components. For example, any well-known mechanism for implementing a data repository may be used to maintain the route data, including well-known database techniques and other file server technologies. Further, any well-known mechanism for implementing the various user interface components can be used to communicate with and extract data from the data repository. Also, functions or procedures written in any standard programming language can be used to access data stored in the data repository. Further, any mechanism for presenting display screens to a user, for obtaining input from the user, and for communicating with the data functions can be used.

Figure 11:
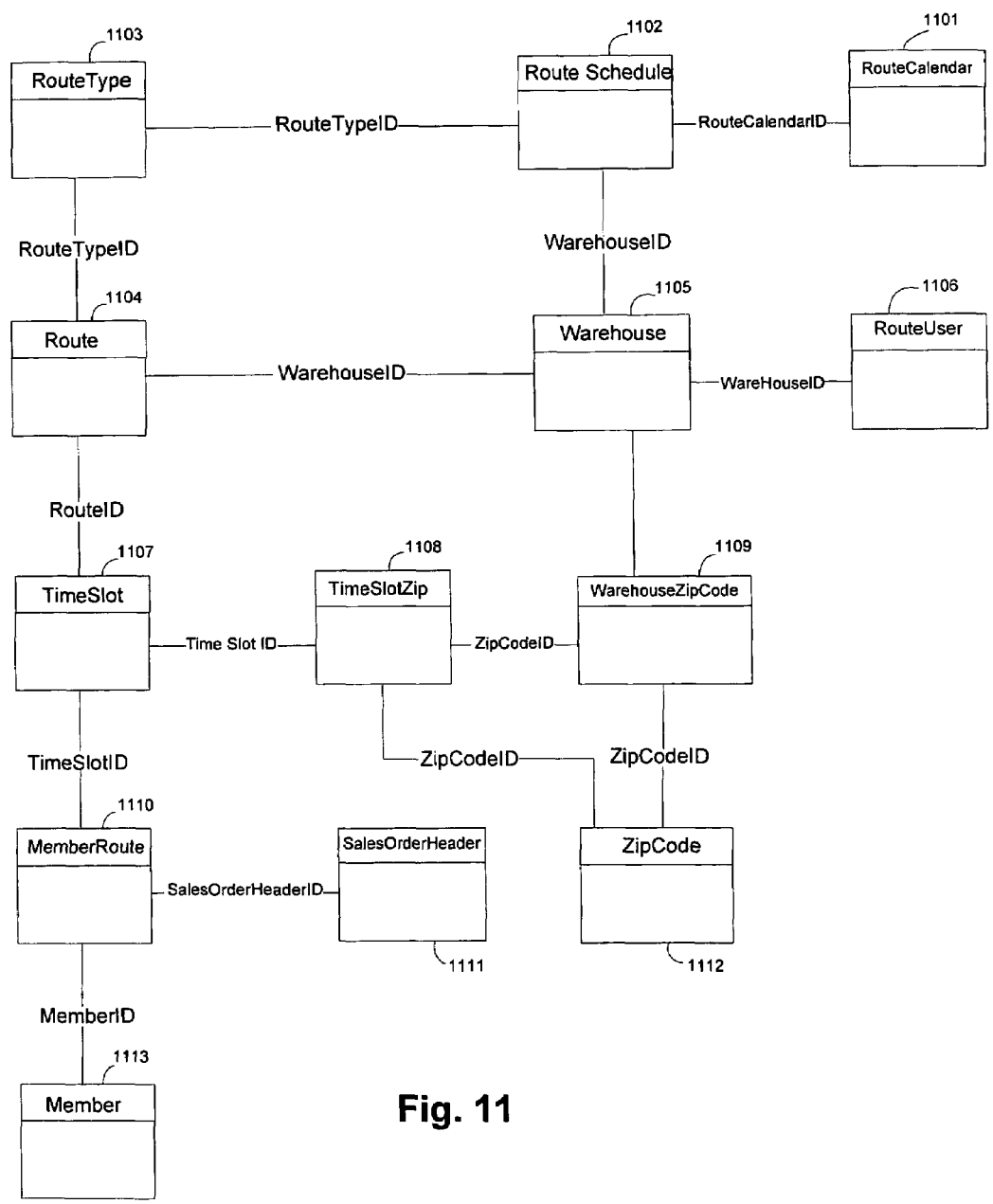
FIG. 11 is an example block diagram of the database tables stored in an exemplary embodiment of the Route and Timeslot Scheduler route database.

FIG. 11 is an example block diagram of the database tables stored in an exemplary embodiment of the Route and Timeslot Scheduler route database. The data stored in route database 101 is associated with a particular warehouse. Thus, a warehouse identifier may be used to select particular template data or particular scheduling data. The RouteCalendar table 1101 and the RouteSchedule table 1102 are used to implement the calendar data displayed by the Calendar user interface component 107. These tables are used to determine the permissible route types for a particular calendar day. The RouteType table 1103, as indexed by the route type, is used to determine the set of default (template) route types that are available or permissible. These default route types are filtered by the permissible route types for a particular day to select the available default routes from Route table 1104. For each available default route, a route identifier can be retrieved from the Route table 1104 and used to determine a set of corresponding default timeslots from TimeSlot table 1107. Thus, the Route table 1104 in conjunction with the TimeSlot table 1107, comprise the template data for a particular day of the week for a particular warehouse. Geographic data is associated with each timeslot of a route and is stored in TimeSlotZip table 1108. When placeholders (scheduled stops) are created for a particular calendar day, entries are created in the MemberRoute table 1110. Once these scheduled stops are allocated to actual orders, the MemberRoute entries are associated with entries in the SalesOrder table 1111. In addition, a scheduled stop may be associated with a particular ordering customer, such as a member stored in Member table 1113. Such information may be used, for example, to reserve particular timeslot entries for members of a preferred status, such as recurring customers who schedule a delivery of an order at a particular timeslot each week or each day.

Figure 12:
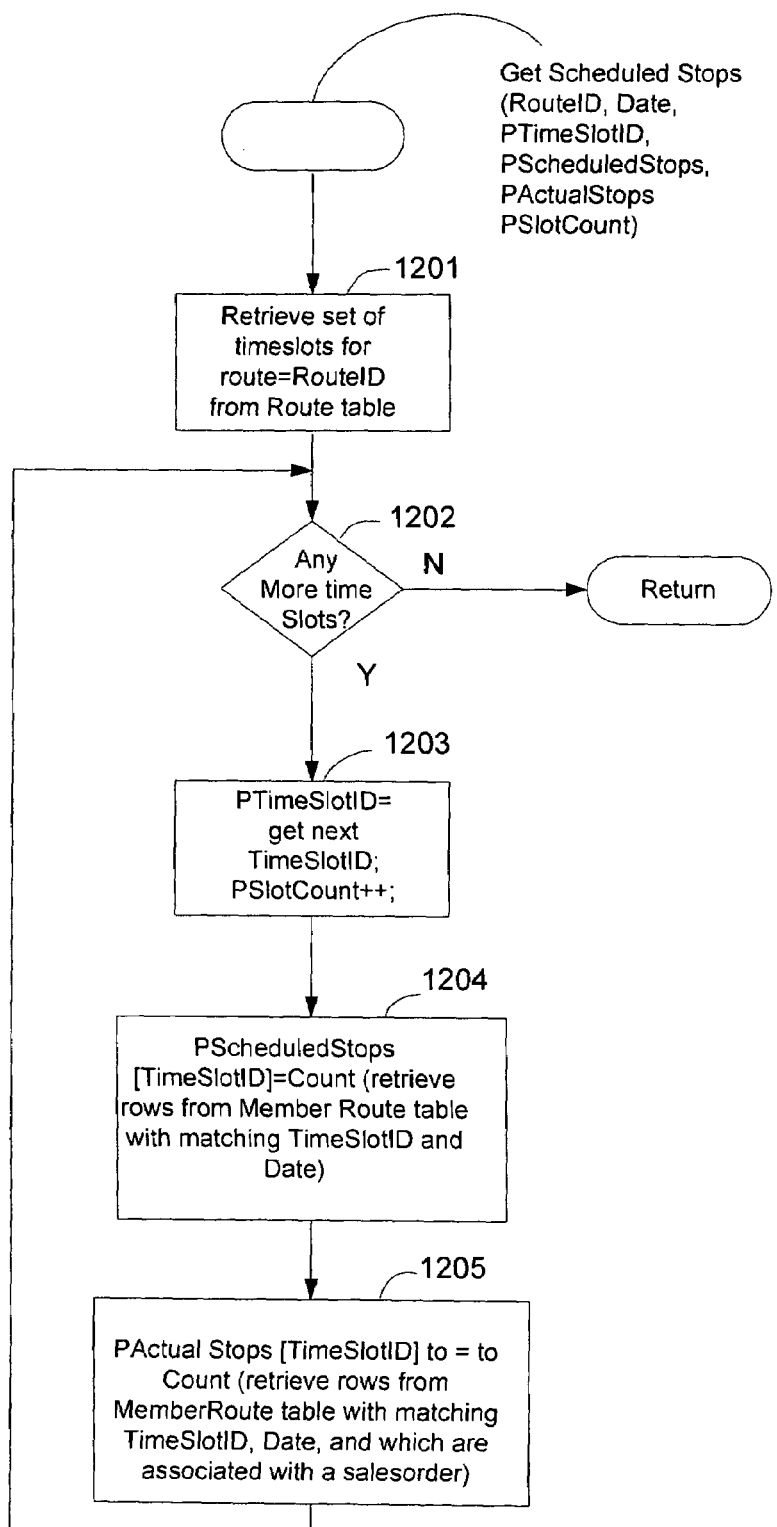
FIG. 12 is an example flow diagram of the steps performed by the Route and Timeslot Scheduler to provide the data that is displayed in the Route Schedule form.

FIG. 12 is an example flow diagram of the steps performed by the Route and Timeslot Scheduler to provide the data that is displayed in the Route Schedule form. In summary, for each route displayed, the GetScheduledStops routine determines the number of scheduled and actual stops and displays them in the appropriate place on the Schedule form. For example, the number of scheduled stops is displayed in the "S" column of each slot column 207 in FIG. 2, and the number of actual stops is displayed in column "A" of each slot column 207 in FIG. 2. The GetScheduledStops routine receives as input a route identifier and a date and returns a count of the number of scheduled stops and the number of actual stops that correspond to the designated route and date. Specifically, in step 1201, the routine retrieves the set of timeslots that correspond to the designated route identifier. One skilled in the art will appreciate that "set" is used to denote any collection of data, regardless of how the grouping is implemented, for example as a list, stack, array, hash table, or similar data structure. In one implementation, this set of timeslots is retrieved by querying the Route table 1104. Steps 1202-1205 perform a loop over all of the timeslots for a particular route to determine the number of scheduled stops and the number of actual stops. In step 1202, the routine determines whether there are any more timeslot entries to process and, if not, returns, else continues in step 1203. In step 1203, the routine retrieves the next timeslot entry from the set to process as the current timeslot. The identifier of the retrieved timeslot entry is stored in the PTimeSlotID array in order to identify the returned count of scheduled stops and actual stops. In addition, the number of timeslots already processed is incremented to inform the RTS of the number of timeslots for which data is being returned. In step 1204, the routine determines the number of scheduled stops that exist (as placeholders) for the current timeslot. This determination is accomplished, for example, by searching the MemberRoute table 1110 for entries that correspond to the identifier of the current timeslot. The total number of MemberRoute entries that correspond to the current timeslot for the designated route is returned in the array PScheduledStops. In step 1205, the routine determines the number of actual stops that exist for the current timeslot of the designated route. This determination is accomplished, for example, by searching the MemberRoute table 1110 for entries that correspond to the identifier of the current timeslot and that are further associated with a SalesOrder entry in the SalesOrderHeader table 1111 or a member entry in the member table 1113. The total number of such entries is returned in the PActualStops array. The routine then continues at the beginning of the loop in step 1202 to process the remaining timeslots that match the designated route and date.

Figure 13:
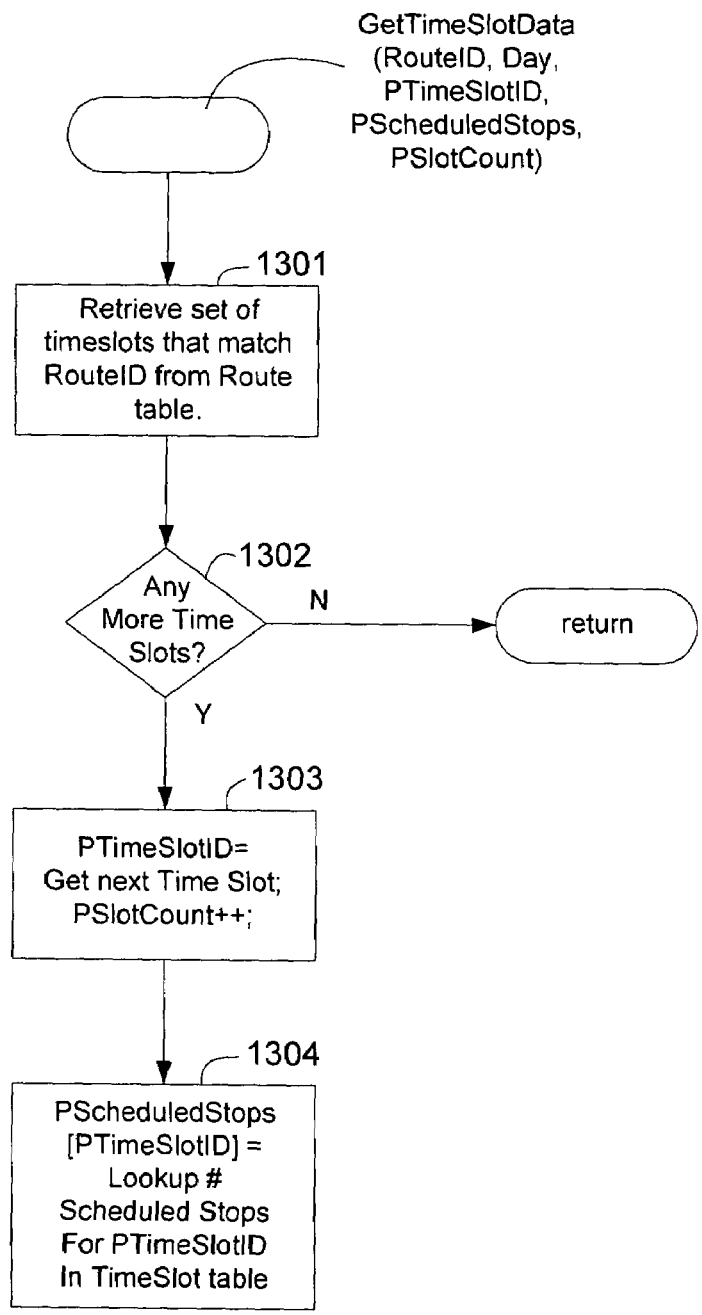
FIG. 13 is a flow diagram of the steps performed by the Route and Timeslot Scheduler to populate timeslot data in the route Template form.

FIG. 13 is a flow diagram of the steps performed by the Route and Timeslot Scheduler to populate timeslot data in the route Template form. Examples of the route Template form are shown in FIGS. 4-6. The GetTimeSlotData routine is used by the route Template form to fill in the number of default delivery stops (potential stops) 407 for each timeslot 408 in each route entry 402 of the form. The GetTimeSlotData routine receives as input a route identifier and a day of the week. The routine returns in the PScheduledStops array the number of default delivery stops for each timeslot. This routine is similar to the GetScheduledStops routine, except that it retrieves data from the TimeSlot table 1107, instead of from the MemberRoute table 1110. Specifically, in step 1301, the routine retrieves the set of timeslot entries from the Route table 1107 that match the designated route identifier. Steps 1302-1304 perform a loop over each of these timeslot entries to determine the number of default delivery stops that are used to create scheduled stops (potential stops). In step 1302, the routine determines whether there are any more timeslots to process and, if not, returns, else continues in step 1303. In step 1303, the routine sets up the return parameters for the next timeslot entry and selects the next timeslot entry. In step 1304, the routine looks up the number of potential stops that correspond to the selected timeslot entry in the TimeSlot table 1107 and returns this number in the PScheduledStops output parameter. The routine then continues to the beginning of the loop at step 1302.

Figure 14:
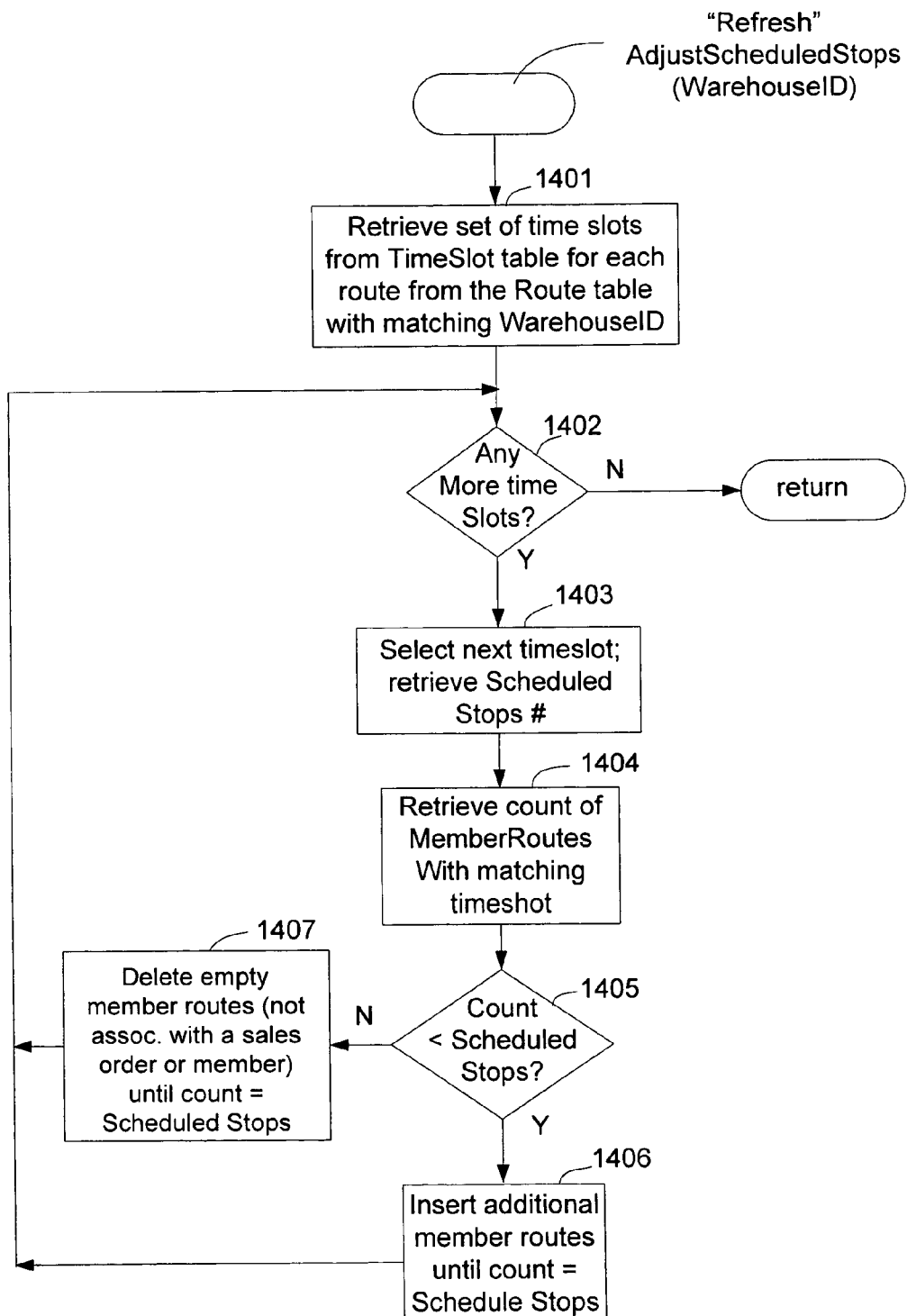
FIG. 14 is an example flow diagram of the steps performed by the Route and Timeslot Scheduler to modify the number of scheduled stops in accordance with modifications that have been made to template data.

FIG. 14 is an example flow diagram of the steps performed by the Route and Timeslot Scheduler to modify the number of scheduled stops in accordance with modifications that have been made to template data. The AdjustScheduledStops routine is invoked, for example, from the Template form, when a user with administrative privileges changes the number of potential stops 407 for a particular timeslot (for example, timeslot 408) and then presses the Refresh button 405. After adjusting the template data appropriately, this routine automatically updates the scheduled stop data in the route database to correspond to the newly entered changes. Preferably, all existing daily stop entries (e.g., entries in MemberRoute table 1110) that correspond to the day of the week template that was changed are updated. This action is performed because the RTS creates daily scheduled stops as placeholders in advance of orders to enable the scheduling of potential future orders. (Recall that an example implementation creates potential delivery stops up to sixteen days in advance.)

The AdjustScheduledStops routine receives as input a warehouse identifier so that all of the existing scheduled stops for that warehouse can be updated appropriately when a template is changed. In step 1401, the routine determines and retrieves the set of timeslots that match all of the routes for the warehouse identified by the designated warehouse identifier. One skilled in the art will recognize that this routine could be modified to refresh only a particular day of the week or a particular calendar day by only updating the MemberRoute entries for the timeslots and routes of a designated day. Other such modifications are also contemplated. In steps 1402-1407, the routine loops over the timeslot entries retrieved to adjust the corresponding MemberRoute entries. In particular, in step 1402, the routine determines whether there are any more timeslot entries to process and, if not, returns, else continues in step 1403. In step 1403, the routine selects the next timeslot entry to process and retrieves the number of default delivery stops (potential stops, as defined by the template data) for that timeslot from the TimeSlot table 1107. The routine next retrieves, in step 1404, the number of MemberRoute entries that correspond to the selected timeslot (existing scheduled stops). Then, in step 1405, the routine determines whether or not the number of potential stops (which may have been adjusted) corresponds to the number of existing MemberRoute entries. If the number of potential stops is less than the number of existing scheduled stops (which have been created as MemberRoute entries), then the routine needs to delete existing scheduled stops in the MemberRoute table 1110 until the number of scheduled stops corresponds to the number of potential stops. Specifically, if the number of existing scheduled stops in the MemberRoute table 1110 is less than the number of potential stops, then the routine continues in step 1406, else continues in step 1407. In step 1406, the routine inserts additional MemberRoute entries to correspond to the newly added potential stops until the number of corresponding MemberRoute entries corresponds to the number of potential stops. The routine then continues to the beginning of the loop in step 1402. In step 1407, the routine deletes empty MemberRoute entries to reduce the number of existing scheduled stops down to the newly adjusted number of potential stops. Preferably, the routine does not delete MemberRoute entries that are associated with a current sales order or with a customer (member), because such an association indicates that the scheduled stop has already been allocated to a particular customer or order. The routine then continues to the beginning of the loop in step 1402.

Figure 15:
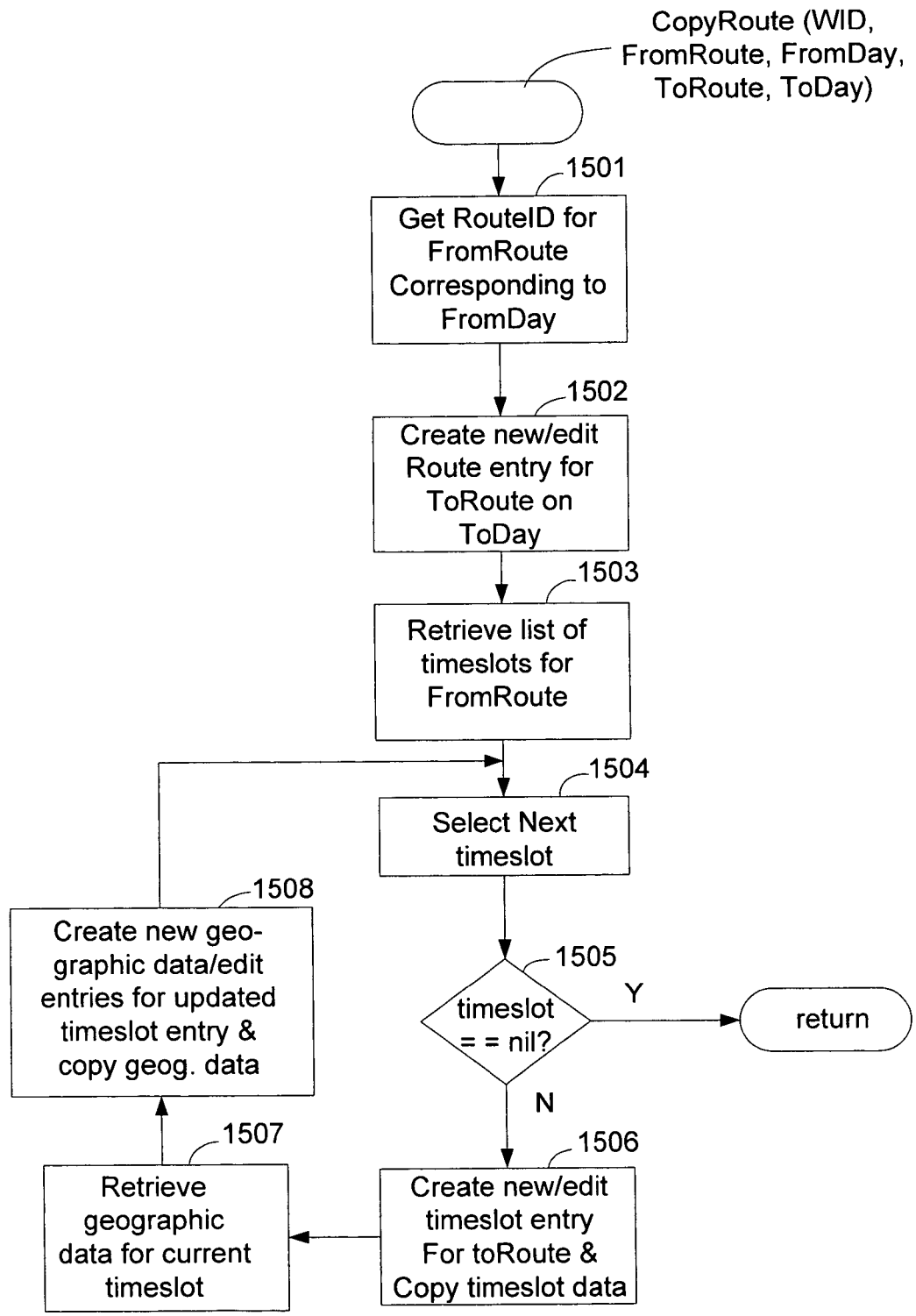
FIG. 15 is an example flow diagram of the steps performed by the Route and Timeslot Scheduler to automatically propagate route information from particular template entries to new or revised template entries.

FIG. 15 is an example flow diagram of the steps performed by the Route and Timeslot Scheduler to automatically propagate route information from particular template entries to new or revised template entries. The CopyRoute routine can be invoked from the Template form shown in FIG. 6 when the Copy Button 607 is depressed. The CopyRoute routine enables a user with administrative privileges to efficiently enter template data either when initially creating new template routes or when modifying an existing template route for a day of the week. The routine updates the TimeSlot table 1107, the TimeSlotZip table 1108, and the Route table 1104. The routine receives as input data a warehouse identifier to associate template entries with a particular warehouse. In addition, the CopyRoute routine receives as input an indication of the source route, the source day of week, the destination route, and the destination day of week.

Specifically, in step 1501, the routine obtains a route identifier for the designated source route for the designated source day. The route identifier can be obtained, for example, from Route table 1104. In step 1502, the routine determines whether there is a route entry in the Route table 1104 that corresponds to the designated destination route and day and, if not, creates a new entry for the destination route and day, otherwise edits the located route entry. If a new destination route entry is created, its initial data is copied from the source route entry data. In step 1503, the routine retrieves from the TimeSlot table 1107 the set of timeslot entries that corresponds to the designated source route and day. The routine then loops in steps 1504-1508 to copy these timeslot entries as appropriate to the new or existing timeslot entries that correspond to the designated destination route and day. In step 1504, the routine selects the next timeslot entry. In step 1505, the routine determines whether there are more timeslot entries to process and if so, continues in step 1506, else returns. In step 1506, the routine determines whether there already exists a timeslot entry that corresponds to the destination route and day and, if not, creates one, otherwise uses the existing timeslot entry. The routine then copies the timeslot data from the selected timeslot entry to the destination timeslot entry. In step 1507, the routine retrieves the geographic data that is associated with the selected (source) timeslot, for example the zip code data that is stored in TimeSlotZip table 1108. As mentioned earlier, this geographic data can be any type of data that is used to define a route, which for the purposes of this example, are zip codes. In step 1508, the routine determines whether there is an existing entry for the destination geographic data and, if so, uses this entry, otherwise creates a new entry. The source geographic data entry is then copied to the destination geographic data entry. The routine then continues to the beginning of the loop in step 1504.

Figure 16:
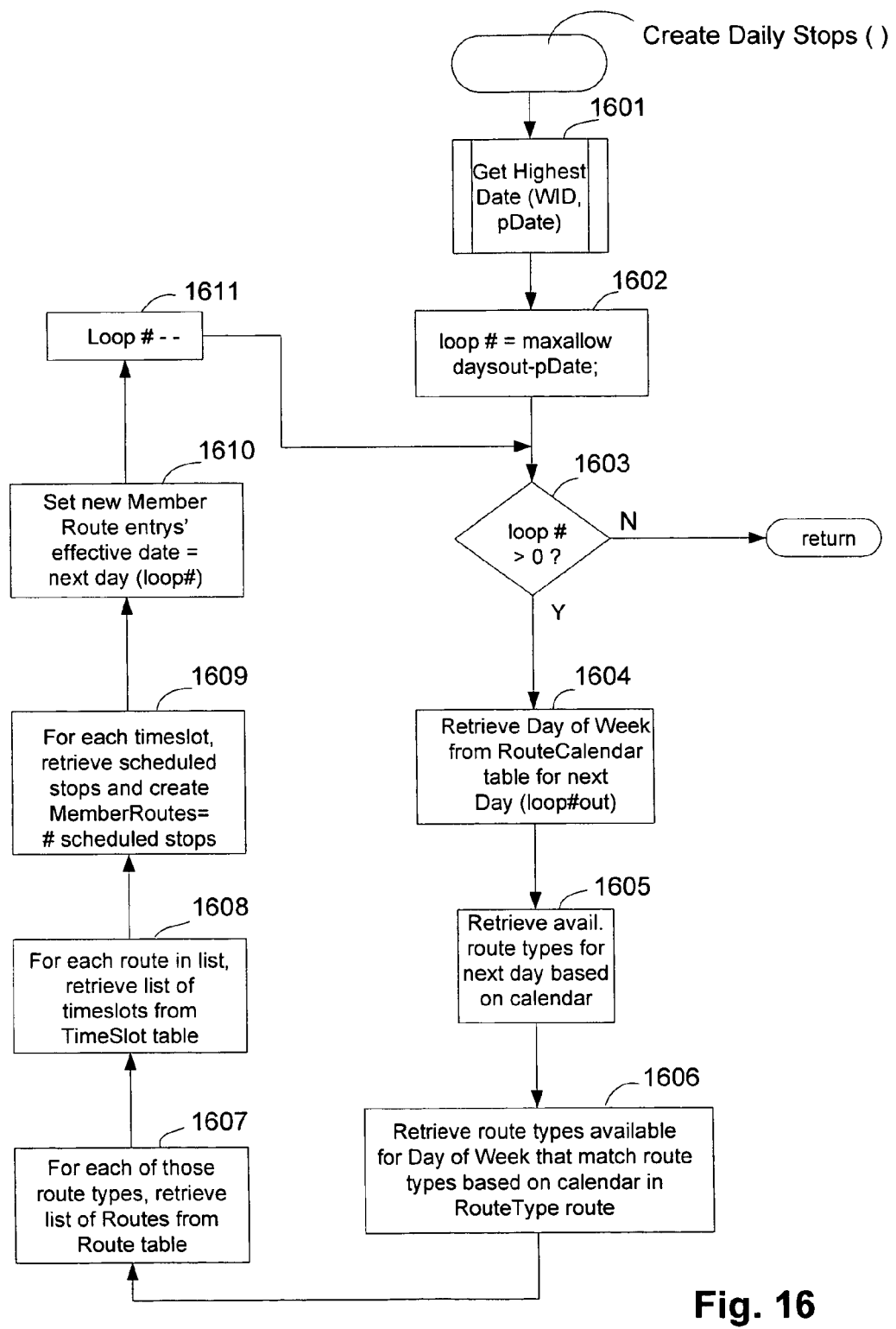
FIG. 16 is an example flow diagram of the steps executed by the Route and Timeslot Scheduler to schedule delivery stops according to the calendar and template schedules.

FIG. 16 is an example flow diagram of the steps executed by the Route and Timeslot Scheduler to schedule delivery stops according to the calendar and template schedules. The CreateDailyStops routine is preferably executed daily to extend the potential order period by creating new delivery stops for a day at the end of the potential order period. For example, assuming that the RTS supports a sixteen-day potential order period, the CreateDailyStops routine is run each day to add a new sixteenth day to the end of the sixteen day period. To account for the possibility that the routine fails on any particular day or was not run for some reason, the CreateDailyStops routine first detects the last day of the order period for which scheduled stops exist, so that stops can be added as needed to fill out the potential order period. Thus, the routine first determines the last (highest future) date for which there exists scheduled stops, determines how many days out delivery stops are needed to complete the next sixteen day period, and creates the appropriate scheduled stops according to the calendar and template data. As discussed earlier, the calendar data is referred to first to determine what route types are permissible for the particular calendar day, and then a day of week template is used to generate routes with appropriate timeslots for the route types that are actually available.

Figure 17:
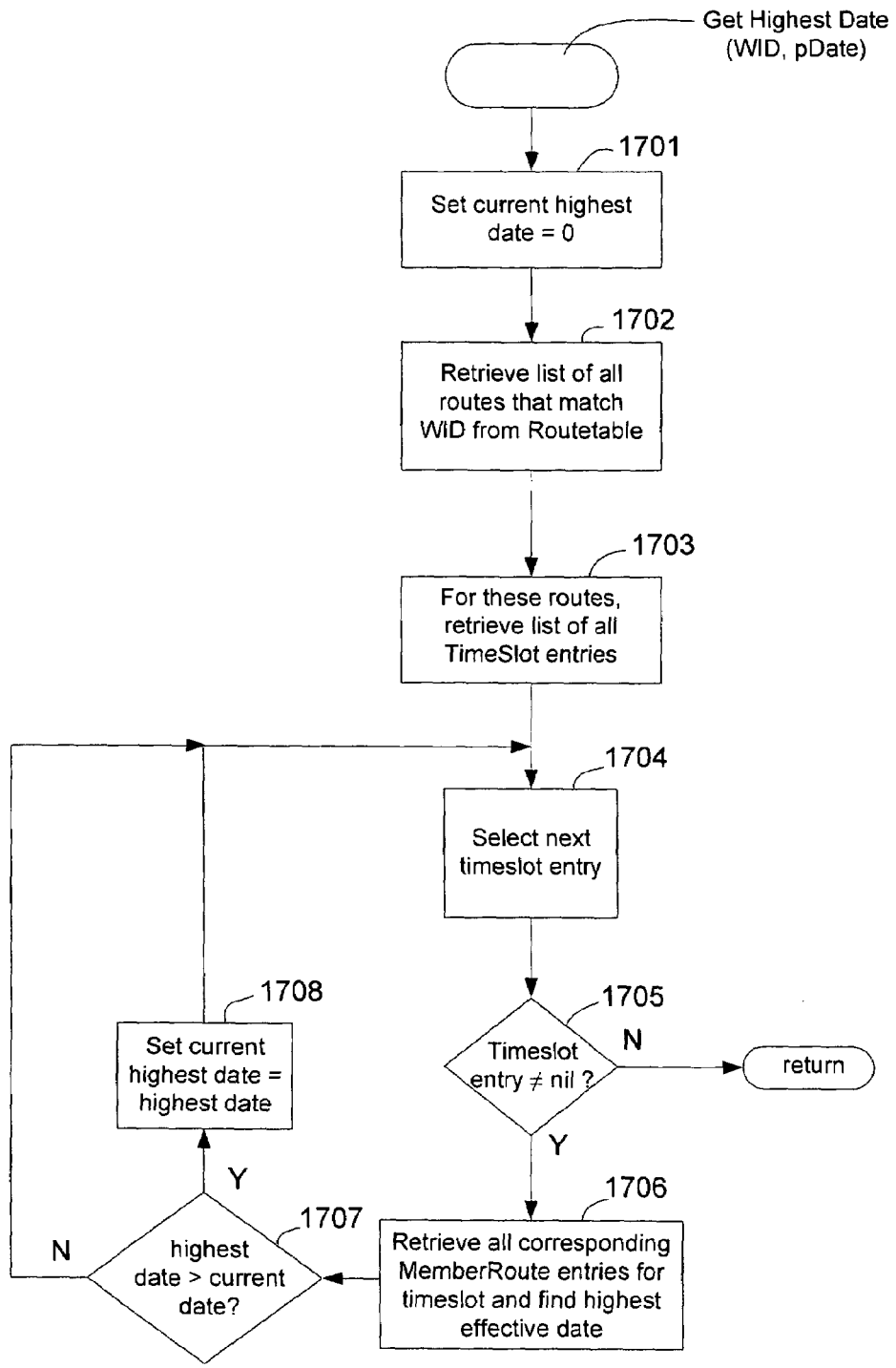
FIG. 17 is an example flow diagram of the steps performed by the Route and Timeslot Scheduler to retrieve the highest future date for which there exists MemberRoute entries in the route database.

Specifically, in step 1601, the CreateDailyStops routine invokes the routine GetHighestDate, which is described in detail in FIG. 17. The GetHighestDate routine returns the highest future date for which there exists actual MemberRoute entries in the MemberRoute table 1110. In step 1602, the routine determines how many days worth of delivery stops it needs to create (and for which dates) by subtracting the retrieved highest date from a computed maximum allowable future date. For example, if the routine is using a sixteen day potential order period, and the current date is Jan. 1, 2000, then the maximum allowable date is Jan. 17, 2000. If the highest future date returned by the GetHighestDate routine is Jan. 10, 2000, then the difference between January 17 and January 10, which is seven days worth of data, needs to be created. The routine then loops in steps 1603-1610 for the determined number of days determined to create the needed scheduled stops. In step 1603, the routine determines whether it has finished creating scheduled stops for the determined number of days and, if so, returns, otherwise continues in step 1604. In step 1604, the routine retrieves an indication of the day of the week of the current calendar day being processed from the RouteCalendar table 1101. For example, if the routine is creating stops for Jan. 12, 2000 (two days out from the current highest future date) then the routine needs to look at the RouteCalendar entries to determine the day of the week that corresponds to Jan. 12, 2000. In step 1605, the routine retrieves the route types that are available for the current calendar day from the RouteSchedule table 1102. In step 1606, the routine retrieves from the Route Type table 1103 the route types that are available for the determined day of week that also match the permissible route types for that current calendar day. In step 1607, for each of the available route types that are permissible, the routine retrieves a set of available routes from the Route table 1104. In step 1608, for each available route, the routine retrieves a set of corresponding timeslot entries from the TimeSlot table 1107. In step 1609, for each timeslot entries, the routine retrieves the number of potential stops (default delivery stops) and then creates entries in the MemberRoute table 1110 for each scheduled stop for the current day being processed. In step 1610, the routine records in each of these new MemberRoute entries the current date as its effective date. The routine then continues in step 1611 to increment the loop variable, and returns to the beginning of the loop in step 1603.

FIG. 17 is an example flow diagram of the steps performed by the Route and Timeslot Scheduler to retrieve the highest future date for which there exists MemberRoute entries in the route database. The GetHighestDate routine receives as an input parameter a warehouse identifier and returns the highest future date. In summary, the routine searches the MemberRoute table 1110 entries for a particular warehouse and determines the furthest date in the future for which there exists an entry. Specifically, in step 1701, the routine initializes a variable, which tracks the current highest future date. In step 1702, the routine retrieves the set of all routes from the Route table 1104 that match the warehouse identifier. In step 1703, the routine then determines the set of timeslot entries in the TimeSlot table 1107 that correspond to the set of determined routes. In steps 1704-1708, the routine loops through each timeslot entry and determines, from the corresponding MemberRoute entries, the furthest date in the future for which there exists a MemberRoute entry. In particular, in step 1704, the routine selects the next timeslot entry from the determined set of timeslot entries. In step 1705, if there are no more timeslot entries, the routine returns, else it continues in step 1706. In step 1706, the routine retrieves all the MemberRoute entries that correspond to the selected timeslot and retrieved the furthest date in the future of these entries. In step 1707, the routine determines whether the determined furthest date is out in the future beyond the current highest future date and, if so, continues in step 1708, else returns to the beginning of the loop in step 1704. In step 1708, the routine sets the tracking variable of the current highest future date to the new highest future date and returns to the beginning of the loop in step 1704.

Although specific embodiments of, and examples for, the present invention are described herein for illustrative purposes, it is not intended that the invention be limited to these embodiments. Equivalent methods, structures, processes, steps, and other modifications within the spirit of the invention fall within the scope of the invention. For example, the teachings provided herein of the present invention can be applied to other areas of scheduling systems, such as scheduling vehicle maintenance, demonstrations at a conference, or the scheduling of a labor pool to various construction jobs. In addition, the teachings may be applied to other types of distribution systems, such as the distribution of inventory parts to different factories to be assembled into various products. These and other changes may be made to the invention in light of the above detailed description. Accordingly, the invention is not limited by the disclosure, but instead the scope of the present invention is to be determined by the following claims.

The invention claimed is:

1. A computer-implemented method for dynamically creating a schedule of timeslot segments for a plurality of routes and timeslots, the method comprising:
    determining from a calendar, a set of possible route types for a selected day and a template Identifier;
    based upon the determined set of possible route types, retrieving a set of available route types from a template identified by the template identifier, wherein the available route types are limited to those route types that are within the set of possible route types, wherein the template includes at least available route types;
    for each available route type, determining a set of routes for the selected day; and
    for each set of routes, creating in a data repository a set of schedulable timeslot segments that correspond to the selected day,
    wherein the routes are determined based on the available route types, the route types being descriptors or identifiers for grouping the different routes, wherein each of the routes is not separated into different route types, wherein at least one of the available route types is a default route type that is available for distribution of products or services on normal days, wherein at least another one of the available route types is a special route type that is available for distribution of products or services on holidays or without charge, and wherein the special route type can override the default route type, and
    wherein an electronic storefront system thereafter schedules at least one delivery stop using one or more of the set of schedulable timeslot segments, the at least one delivery stop being for delivery of a product or service.

2. The method of claim 1, further comprising for each set of routes, determining a set of timeslots, wherein a portion of the set of schedulable timeslot segments are created to correspond to each timeslot.

3. The method of claim 2 wherein the number of created schedulable timeslot segments that correspond to each timeslot are based upon a potential number of timeslot segments associated with each timeslot.

4. The method of claim 2, further comprising:
    modifying the template such that data that corresponds to at least one of the set of timeslots are changed; and
    updating the created set of schedulable timeslot segments in the data repository to correspond to the changed data.

5. The method of claim 1 wherein the template identifier identifies one of the days of a week.

6. The method of claim 1 wherein the method produces a delivery schedule, wherein as the schedulable timeslot segments are scheduled for the at least one delivery stop, the delivery schedule is updated, and wherein the method further comprises alerting a user when the schedulable timeslot segments available to be scheduled are within a threshold amount of being completely scheduled.

7. The method of claim 1 wherein a schedulable timeslot segment corresponds to an event.

8. The method of claim 1 wherein the selected day is a date in the future.

9. The method of claim 8 wherein the method is used to create schedulable events for a sequence of days in the future.

10. The method of claim 1 wherein the schedulable timeslot segments are sent to another program to be allocated to actual events, and wherein the actual events are scheduled delivery orders.

11. The method of claim 1 wherein the special route type indicates that no routes are available for the selected day.

12. The method of claim 1 wherein the special route type indicates holiday service is available for the selected day.

13. The method of claim 1 wherein each route is based upon geographical data.

14. The method of claim 1, further comprising:
    modifying the template such that data that corresponds to at least one of the set of routes are changed; and
    updating the created set of schedulable timeslot segments in the data repository to correspond to the changed data.

15. The method of claim 1, further comprising using the determined set of routes to automatically generate in the data repository a set of schedulable timeslot segments that correspond to a different day.

16. The method of claim 1 wherein the method further comprises alerting a user when the schedulable timeslot segments available to be scheduled are within a threshold amount of being completely scheduled.

17. A computer-readable memory medium containing instruction for controlling a computer processor to dynamically create a schedule of timeslot segments for a plurality of routes and timeslots by:
    determining from a calendar, a set of possible route types for a selected day and a template identifier;
    based upon the determined set of possible route types, retrieving a set of available route types from a template identified by the template identifier, wherein the available route types are limited to those route types that are within the set of possible route types, wherein the template includes at least available route types,
    for each available route type, determining a set of routes for the selected day; and
    for each set of routes, creating a data repository a set of schedulable timeslot segments that correspond to the selected day,
    wherein the routes are determined based on the route types, the route types being descriptors or identifiers for grouping the different routes, and wherein each of the routes is not separated into the different route types, wherein at least one of the available route types is a default route type that is available for distribution of products or services on normal days, wherein at least another one of the available route types is a special route type that is available for distribution of products or services on holidays or without charge, and wherein the special route type can override the default route type, and
    wherein an electronic storefront program thereafter schedules at least one delivery stop using one or more of the set of schedulable timeslot segments, the at least one delivery stop being for delivery of a product or service.

18. The computer-readable memory medium of claim 17, further comprising for each set of routes, determining a set of timeslots, wherein a portion of the set of schedulable timeslot segments are created to correspond to each timeslot.

19. The computer-readable memory medium of claim 18 wherein the number of created schedulable timeslot segments that correspond to each timeslot are based upon a potential number of timeslot segments associated with each timeslot.

20. The computer-readable memory medium of claim 17 wherein a schedulable timeslot segment corresponds to a delivery stop.

21. The computer-readable memory medium of claim 20 wherein a schedulable timeslot segment is allocated to an order to delivery groceries.

22. The computer-readable memory medium of claim 17 wherein the product or service was purchased at an online grocery store.

23. The computer-readable memory medium of claim 17,
   wherein the set of schedulable timeslot segments supports the scheduling of a delivery of a product a plurality of days into the future, and
   wherein at least one route type in the set of possible route types indicates that (i) no routes are available for the selected day, or (ii) a holiday service is available for the selected day.

24. The computer-readable memory medium of claim 17 wherein computer-readable medium further contains instructions for controlling the computer processor to alert a user when the schedulable timeslot segments available to be scheduled are within a threshold amount of being completely scheduled.

25. A computer-based home delivery scheduling system comprising:
   a data repository;
      a set of routines for automatically creating in the data repository scheduled timeslot segments for each timeslot, for each route, for a designated calendar day, based upon a template and a calendar system that indicates available routes, timeslots, and numbers of potential timeslot segments per timeslot subject to the available routes being permissible on a particular calendar day, wherein the template is a master pattern from which a copy may be made to create a schedule, wherein the template includes at least available route types, wherein the routes are determined based on the available route types, the available route types being descriptors or identifiers for grouping the different routes, each of the routes is not separated into different route types, at least one of the available route types is a default route type that is available for distribution of products or services on normal days, at least another one of the available route types is a special route type that is available for distribution of products or services on holidays or without charge, and the special route type can override the default route type; and
   a user interface for displaying and modifying scheduling data stored in the data repository by invoking the set of routines,
   wherein thereafter using the scheduled timeslot segments to schedule deliveries of products and services purchased at an electronic storefront.

26. The scheduling system of claim 24 wherein the available routes, timeslots, and numbers of potential timeslot segment per timeslot are grouped by day of week.

27. The scheduling system of claim 24 wherein the user interface comprises a collection of database forms.

28. The scheduling system of claim 24 wherein the elements comprise a database system.

29. The scheduling system of claim 24 wherein a scheduled timeslot segment for a timeslot, for a route, for a designated calendar day that was created in the data repository is allocated to an order for a product or service.

30. The scheduling system of claim 24 wherein a scheduled timeslot segment for a timeslot, for a route, for a designated calendar day that was created in the data repository is allocated to a particular customer.

31. The scheduling system of claim 30 wherein a timeslot segment is allocated to the particular customer based upon a rating system.

* * * * *

UNITED STATES PATENT AND TRADEMARK OFFICE
CERTIFICATE OF CORRECTION

| | | |
|---|---|---|
| PATENT NO. | : 7,251,612 B1 | Page 1 of 1 |
| APPLICATION NO. | : 09/620199 | |
| DATED | : July 31, 2007 | |
| INVENTOR(S) | : Parker et al. | |

It is certified that error appears in the above-identified patent and that said Letters Patent is hereby corrected as shown below:

IN THE CLAIMS:

Column 18, line 21, "claim 24" should be --claim 25--.

Column 18, line 23, "segment" should be --segments--.

Column 18, line 24, "claim 24" should be --claim 25--.

Column 18, line 26, "claim 24" should be --claim 25--.

Column 18, line 28, "claim 24" should be --claim 25--.

Column 18, line 32, "claim 24" should be --claim 25--.

Signed and Sealed this

Twenty-fifth Day of August, 2009

David J. Kappos
*Director of the United States Patent and Trademark Office*